United States Patent [19]
Takeuchi et al.

[11] Patent Number: 5,944,778
[45] Date of Patent: Aug. 31, 1999

[54] PERIODIC PROCESS SCHEDULING METHOD

[75] Inventors: Tadashi Takeuchi, Yokohama; Masaaki Iwasaki, Tachikawa; Masahiko Nakahara, Yokohama; Takahiro Nakano, Kawasaki, all of Japan

[73] Assignee: Hitachi, Ltd., Tokyo, Japan

[21] Appl. No.: 08/824,338

[22] Filed: Mar. 26, 1997

[30] Foreign Application Priority Data

Mar. 28, 1996 [JP] Japan .................................. 8-073673

[51] Int. Cl.⁶ ...................................................... G06F 9/00
[52] U.S. Cl. ............................................. 709/100; 709/102
[58] Field of Search ................................... 709/100, 102, 709/103, 106

[56] References Cited

PUBLICATIONS

N. Nishio et al. "Conductor–Performer: A Middle Ware Architecture for Continuous–Media Applications", 1st International Workshop on Real Time Operating Applications, 1994.
M. Isawaki et al. "A Micro–kernel for Isochronus Video––Data Transfer", Mar. 15, 1997.
Philippe Robin, Implementing a QoS Controlled ATM Based Communication Systen in Chorus, Mar. 19, 1994.
Digital Equipment Corporation, Guide to DECthreads, Jul. 1994.
J. Stankovic, "The Spring Kernel: A New Paradigm for Real–Time Operating Systems" 8283 Operating Systems Review (SIGOPS) Jul. 23, 1989, No. 3, pp. 54–71.
K. Ramaritham, Scheduling Algorithms and Operating Systems Support for Real–Time Systems, 8078 Proceedings of the IEEE, Jan. 1994, No. 1, pp. 55–67.

*Primary Examiner*—Majid A. Banankhah
*Attorney, Agent, or Firm*—Antonelli, Terry, Stout & Kraus, LLP

[57] ABSTRACT

A scheduling method of a periodic process of a computer system for keeping the execution interval of each process group constant as far as possible in the case where a plurality of process groups including periodically executed processes are executed in parallel. If a group master process of each process group specifies a wakeup interval period and a required CPU time per period and requests allocation of a CPU time, then a CPU allocation time of a specified process group is secured so as not to collide with a CPU allocation time of another process group, and a scheduling table is created so as to maintain the specified wakeup interval period. In response to arrival of time when one of the process groups should be waked up, a kernel process or a scheduler conducts wakeup by changing execution priority of a process belonging to this process group to highest priority ("raised") in the system, and thereafter maintains the highest priority for CPU allocation time consecutively allocated.

9 Claims, 18 Drawing Sheets

FIG.8

|  | "Interval" VALUE 801 | "Length" VALUE 802 |
|---|---|---|
| PROCESS GROUP A | 8 | 2 |
| PROCESS GROUP B | 16 | 3 |
| PROCESS GROUP C | 32 | 7 |

FIG.9

Index 914

| PROCESS GROUP 915 | TIME 916 | END FLAG 917 | |
|---|---|---|---|
| A | 2 | TRUE | 901 |
| B | 3 | TRUE | 902 |
| C | 1 | FALSE | 903 |
| OTHERS | | | 904 |
| A | 2 | TRUE | 905 |
| C | 6 | TRUE | 906 |
| OTHERS | | | 907 |
| A | 2 | TRUE | 908 |
| B | 3 | TRUE | 910 |
| OTHERS | | | 911 |
| A | 2 | TRUE | 912 |
| OTHERS | | | 913 |

```
1601  create_proc_group(MYSELF, slave_pid_array, proc_array_number, &pgroupid);
1602  alloc_time_slot(pgroupid, interval, length);
1603  for(I=0;I<NTINES;I++){
1604      /* CONTINUOUS MEDIA PROCESSING CORRESPONDING TO ONE PERIOD */
1605      proc_raise_handoff(nextpid, PRIORITY_DEPRESSED);
1606  }
1607  dealloc_time_slot(pgroupid);
1608  destroy_proc_group(pgroupid);
1609  exit(0);
```

FIG.17

```
1701  for(I=0;I<NTINES;I++){
1702      /* CONTINUOUS MEDIA PROCESSING CORRESPONDING TO ONE PERIOD */
1703      proc_raise_handoff(nextpid, PRIORITY_DEPRESSED);
1704      (proc_raise_cancel(myself, PRIORITY_DEPRESSED);)
1705  }
1706  exit(0);
```

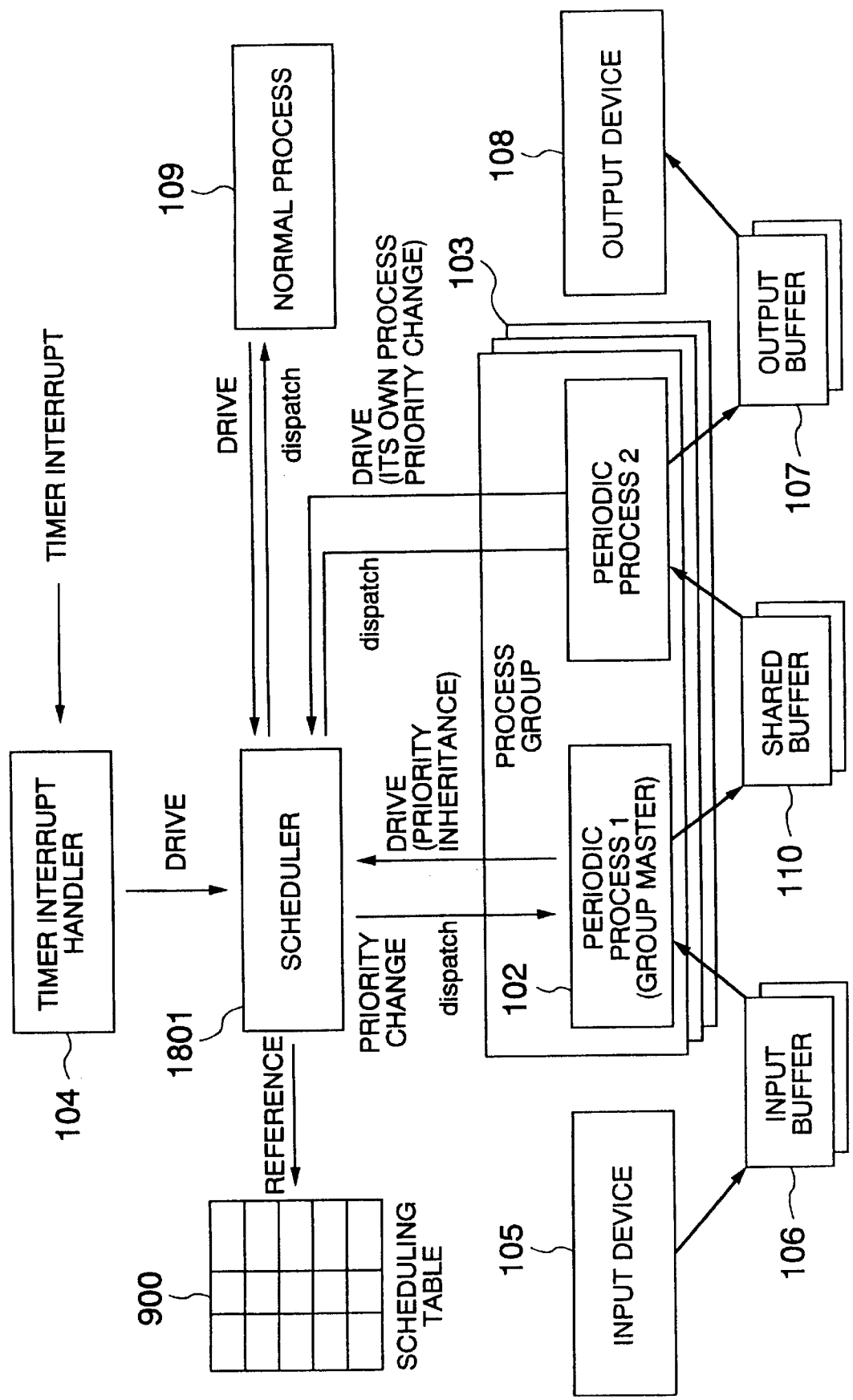

PERIODIC PROCESS SCHEDULING METHOD

BACKGROUND OF THE INVENTION

The present invention relates to a scheduling method of a process of a computer system, and in particular to a process scheduling method for periodically starting each process.

Conventionally as the scheduling method of a process for conducting continuous media, a scheduling method using the "Conductor/Performer" model is known. (Nishio et al., "Conductor/Performer," 1st International Workshop on Real-Time Operating Systems and Applications, 1994.) The term "continuous media processing" means processing for converting and transferring data obtained by digitizing images or speech.

In the case where only one stream exists in a system, this method assures any process belonging to the stream of being periodically scheduled. Herein, however, the term "stream" means a group of processes delivering worked continuous media data directly or indirectly to each other. Each of processes belonging to the same stream are provided with the unique order of conducting the work processing of continuous media data. The top process obtains input of the continuous media data from an external device (such as a video digitizer). Each of subsequent processes receives continuous media data worked by a process immediately preceding in order from the immediately preceding process, conducts data work (such as compression processing) to be conducted by itself, and delivers continuous media data worked by itself to a process immediately succeeding in order. The last process outputs continuous media data to the external device (such as a network adapter).

A summary of a scheduling method using a Conductor/Performer model will be hereafter described. For each stream, one periodically driven Conductor process is prepared. The order of Performer processes (i.e., processes belonging to the stream) to be started by the Conductor process is registered beforehand. In accordance with this registered order, the Conductor process starts a Performer process. Therefore, each of both the Conductor process and the Performer processes holds a message queue for wakeup notice of its own process. Wakeup of another process is conducted by transmitting a message to a message queue held by the process.

The Conductor process is driven at time intervals each equal to a specified period. In accordance with the registered order of the Performer processes, the Conductor process repetitively issues a call (function call) for transmitting a message to a message queue owned by the next Performer process in the order and waiting the arrival of a message at a message queue owned by the Conductor process. In other words, the Conductor process repeats the wakeup of a Performer process and sleep lasting until the started Performer process completes the execution of one period. If the last Performer process in order has completed execution, the Conductor process sleeps until the next periodically driven trigger is applied by a timer interrupt.

On the other hand, a Performer process wakes up upon receiving a message from the Conductor process, and conducts continuous media processing corresponding to one period. Upon completing the continuous media processing corresponding to one period, the Performer process issues a call for transmitting a message to a message queue owned by the Conductor process and waiting for the arrival of a message at a message queue owned by its own process. The Performer process sleeps until a message for notifying the wakeup of the next period is transmitted from the Conductor process.

In the case where only one stream exists in the system, the above described scheduling method assures a CPU of being periodically allocated to a Performer process.

In the scheduling method according to the Conductor/Performer model, the following problems occur in the case where a plurality of streams exist in a system.

(a) The priority of each of: the Conductor processes and Performer processes does not change with time. In the case where Conductor processes having different drive periods are mixedly present, the execution start interval of the Conductor processes varies. In other words, when a Conductor process has been waked up, there is a possibility that another Conductor process or another Performer process having the same priority or higher priority is executing. In other words, access contention of the CPU time occurs between the Conductor process waked up and another Conductor process or another Performer process. As a result, the execution start interval of the Conductor process varies, and the execution interval of subsequent Performer process also varies.

(b) Since wakeup notice is conducted by interprocess communication (IPC), function calls of message transmission and message reception occur and overhead caused by wakeup notice is large.

These problems make it difficult to realize continuous media processing required to yield high throughput, such as real time MPEG compression processing of multimedia data. Unless in such processing the buffer management at the time of continuous media data input is conducted without use of an interrupt, sufficient throughput is not obtained because of the interrupt overhead. Even in the case where a plurality of streams exist in the system, therefore, it is necessary to keep the execution interval of a Performer process constant as far as possible and it is necessary for a Performer process to spontaneously change over the input buffer without a notice using an interrupt. In the same way, the overhead of the IPC used for wakeup notice also decreases the throughput.

Furthermore, in the scheduling method according to the Conductor/Performer model, processing for a deadline miss exception (such a state that the processing corresponding to one period could not be completed within a specified time from driving of the Conductor process) is conducted by signal notification to the Conductor process. Since a signal handler has typically the same priority as a subject process does, there is a possibility that execution of a process of another stream will be delayed by the signal handler processing. In other words, there is a possibility that the processing delay of one stream will cause a processing delay of another stream.

SUMMARY OF THE INVENTION

An object of the present invention is to provide a periodic process scheduling method of a computer system, whereby:

(a) the execution interval of a process which conducts continuous media processing is kept constant, even in the case where a plurality of streams are present in a system;

(b) overhead required to control the wakeup and sleep of processes is reduced; and (c) a signal handler for conducting the recovery processing on a processing delay is executed, and thereby a processing delay of another stream is not caused even if a processing delay is incurred in one stream.

Another object of the present invention is to provide a periodic process scheduling method of a computer system, whereby when an asynchronous event such as arrival of a network packet has occurred, the execution interval of the processes which conduct continuous media processing is prevented from varying.

In accordance with one aspect of the present invention, the above described object is achieved by a periodic process scheduling method of a computer system, the computer system including a plurality of process groups, each of the process groups including at least one periodically executed process, the plurality of process groups being executed in parallel, the periodic process scheduling method including the steps of specifying a wakeup interval period and a required CPU time per period for each of the process groups, and securing a CPU allocation time so as to prevent collision between a CPU allocation time of a specified process group and a CPU allocation time of another process group, and adjusting the CPU allocation time and the wakeup period so as to maintain the wakeup interval period of each of specified process groups.

In accordance with another aspect of the present invention, a method for waking up a process scheduled according to the above described process scheduling method further includes the steps of responding to arrival of time when one of the process groups should be waked up, conducting wakeup by changing execution priority of a process belonging to this process group to the highest priority in the system, and thereafter maintaining the highest priority for CPU allocation time consecutively allocated.

In accordance with another aspect of the present invention, the above described process wakeup method further includes the steps of responding to elapse of the CPU allocation time consecutively allocated and consumption of the required CPU time, changing execution priority of a process waked up from the highest priority to reference priority, and notifying this process of timeout.

In accordance with still another aspect of the present invention, an asynchronous event method includes the steps of responding to occurrence of an asynchronous event needing reception of information such as arrival of a network packet during execution of a process having the highest priority in a system, immediately suspending the execution of the process running with the highest priority, securing an information receiving buffer, preparing for reception of the information, thereafter resuming the execution of the process suspended in execution, and referring to received information and conducting processing by using a periodically waked up process.

Other objects, features and advantages of the present invention will become apparent from reading the following description of the embodiments taken in conjunction with the accompanying drawing.

BRIEF DESCRIPTION OF THE DRAWING

FIG. 8 is a diagram showing input data for the creation example of a time slot table;

FIG. 9 is a diagram showing the configuration of a scheduling table;

FIG. 16 is a diagram showing the program of a group master process;

FIG. 17 is a diagram showing the program of a slave process;

FIG. 18 is a diagram showing process wakeup and data flow in a scheduling method according to another embodiment of the present invention;

DESCRIPTION OF THE PREFERRED EMBODIMENTS

Figure 1:
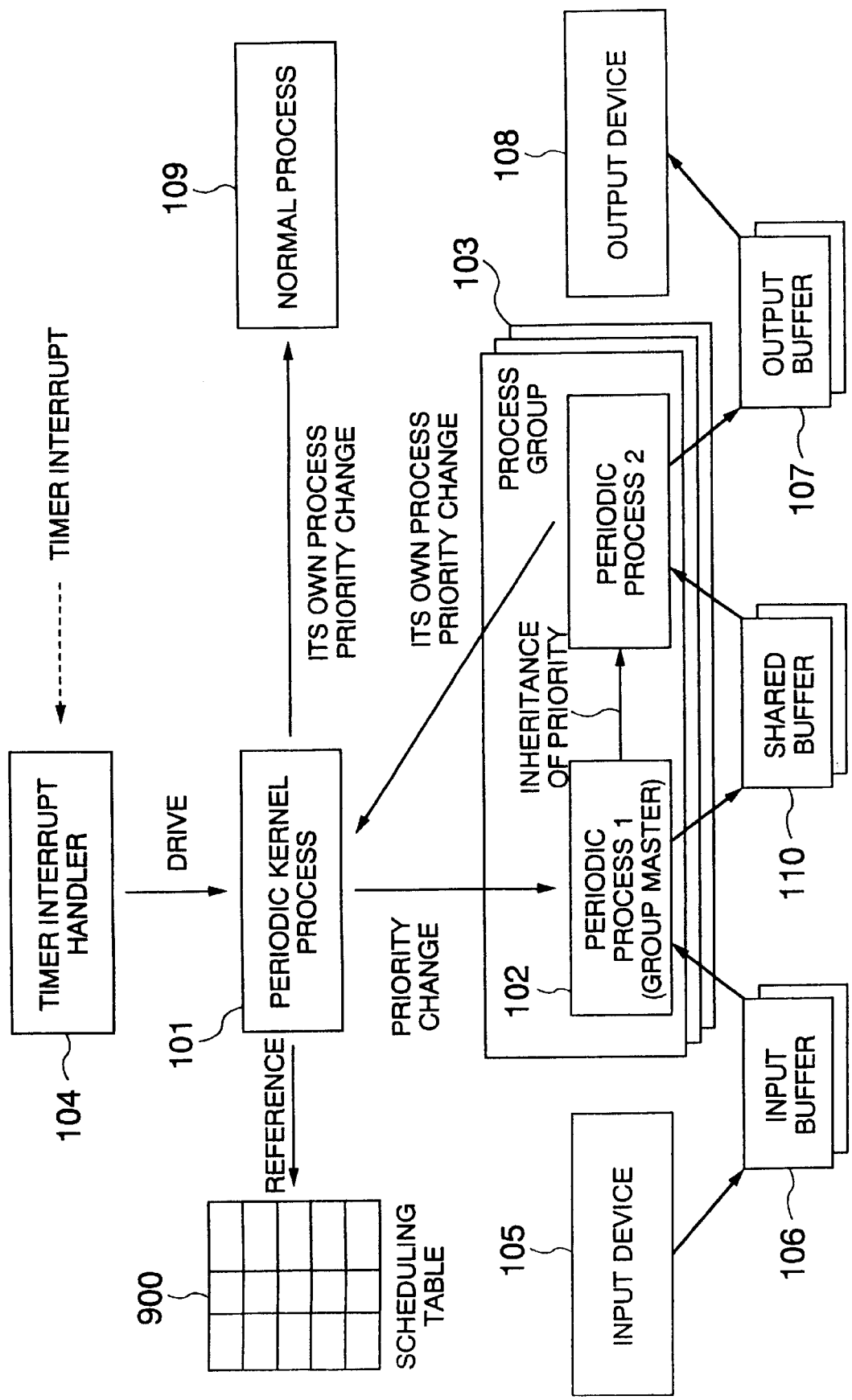
FIG. 1 is a diagram showing the process wakeup and data flow in a scheduling method according to an embodiment of the present invention.

Hereafter, embodiments of the present invention will be described in detail by referring to the drawing.
First Embodiment The flow of process wakeup and the flow of continuous media data for implementing a process scheduling method of a computer system according to an embodiment of the present invention is shown in FIG. 1. In the system, one periodic kernel process 101 exists. The periodic kernel process 101 is a control process periodically driven by timer interrupt handler 104. By referring to a scheduling table 900, the periodic kernel process 101 selects the next process (hereafter referred to as periodic process) group 102 which should process continuous media data. By changing the priority of the selected periodic process group 102, the periodic kernel process 101 implements the periodic scheduling of each periodic process 102. If a periodic process 102 to be scheduled does not exist, the periodic kernel process 101 schedules another normal process 109. Details of this operation will be described afterwards.

At least one periodic process 102 which processes the same continuous media data forms one process group 103. Periodic processes belonging to the process group 103 are given predetermined processing order. A periodic process 102 which is the first in processing order is driven preferentially by a change of priority conducted by the periodic kernel process 101. The periodic process which is the first in processing order reads continuous media data supplied from an input device 105 via an input buffer 106, and works upon the data. The worked data are delivered to a periodic process 102 which is the next in processing order via a shared buffer 110. The priority of a periodic process 102 in the process group 103 is inherited one after another. A periodic process 102 which is the last in processing order outputs data to an output device 108 via an output buffer 107 and lowers the priority of its own process. Thereby, processing of one period of this process group 103 is substantially terminated.

In the system, a plurality of process groups 103, such as; a process group for processing sound information and a process group for processing movie information, may exist.

By the way, a scheduler which is not illustrated is called by a function call to create a scheduling table 900 and drive a specified process. The scheduler is a collection of program modules which are activated by a called process and which conduct processing concerning the scheduling.

In the process group, a group master process exists. The group master process is a process which is at the head in processing order among processes belonging to the process group. Processes belonging to the process group other than the group master process are called slave processes. Creation and deletion of the process group 103 are conducted by the group master process by using the following interface.

Function Name
create_proc_group(master_pid, slave_pid_array, proc_array_number, pgroupid)
Argument
master_pid: process ID of the group master process
slave_pid_array: array of slave process IDs forming the group
proc_array_number: the number of slave process IDs forming the group
pgroupid: an ID of the generated process group is returned
Return Value
SUCCESS: Termination or various error codes
Description The "create_proc_group" function generates a process group having, as the group master, a process specified by "master_pid." The generated process group is formed by process groups specified by "slave_pid_array" and "proc_array_number" in addition to the process specified by "master_pid." A generated process group ID is returned to "pgroupid." It is premised that individual processes having process IDs specified by "master_pid" and "slave_pid_array" have already been generated.

Function Name
destroy_proc_group(pgroupid)
Argument
pgroupid: process group ID
Return Value
SUCCESS: Termination or various error codes
Description The "destroy_proc_group" function deletes a process group specified by "pgroupid."

Figure 2:
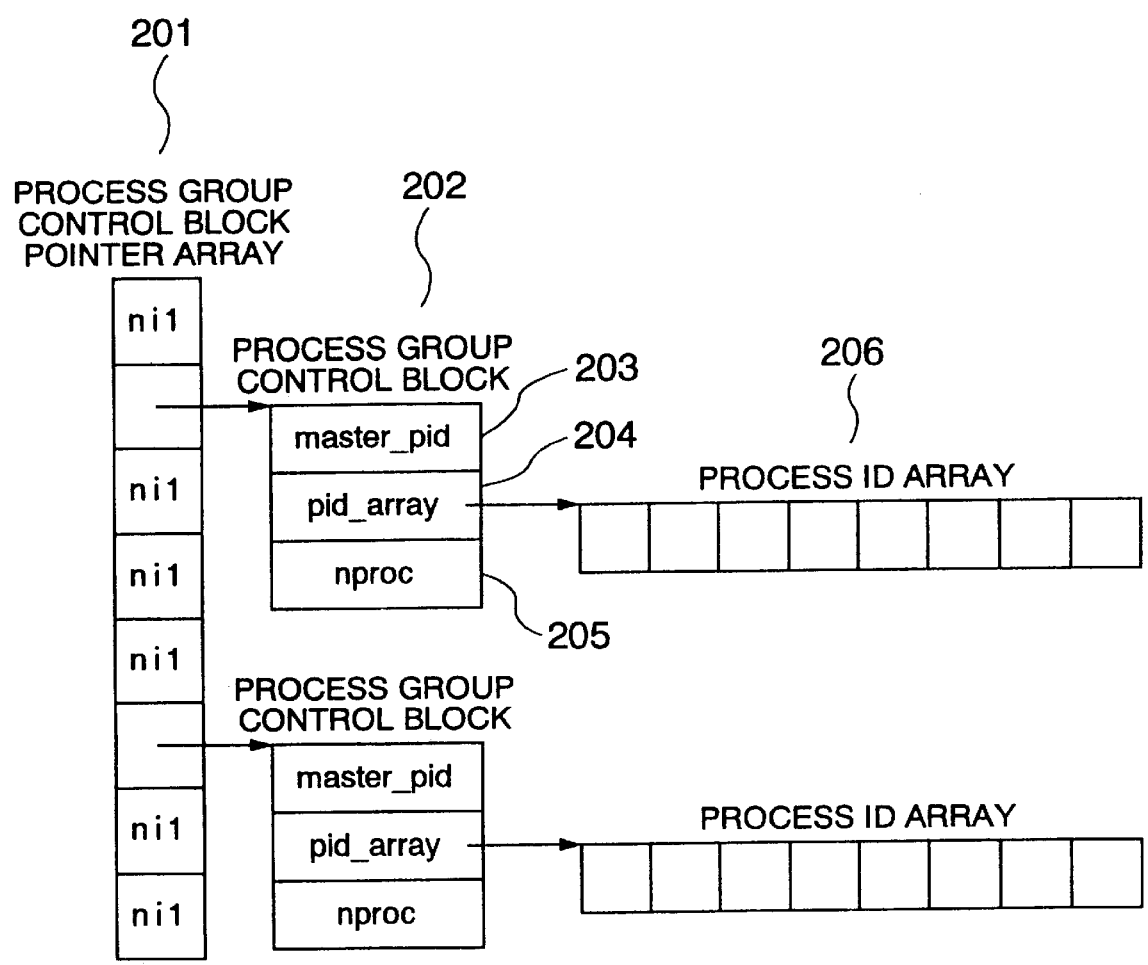
FIG. 2 is a diagram showing the structure of data for managing a process group.

The data structure of array data and a control block used to manage the process group is shown in FIG. 2.

The process group is managed by using a process group control block 202. The process group control block 202 includes a "master_pid" field 203, a "pid_array" field 204, and a "nproc" field 205. The "master_pid" field 203 stores the process ID of the group master process of the process group. The "pid_array" field 204 stores a pointer to a process ID array 206. The process ID array 206 is an array of process IDs of slave processes forming the process group. The "nproc" field 205 stores the number of process IDs stored in the process ID array 206. Furthermore, conversion from a process group ID to a process group control block 202 is conducted by using a process group control block pointer array 201. In other words, a pointer to the process group control block 202 is stored in an element having a process group ID as an index. In the case where a process group control group 202 corresponding to the process group ID does not exist, a "nil" pointer is stored in a corresponding element of the process group control block pointer array 201.

Figure 3:
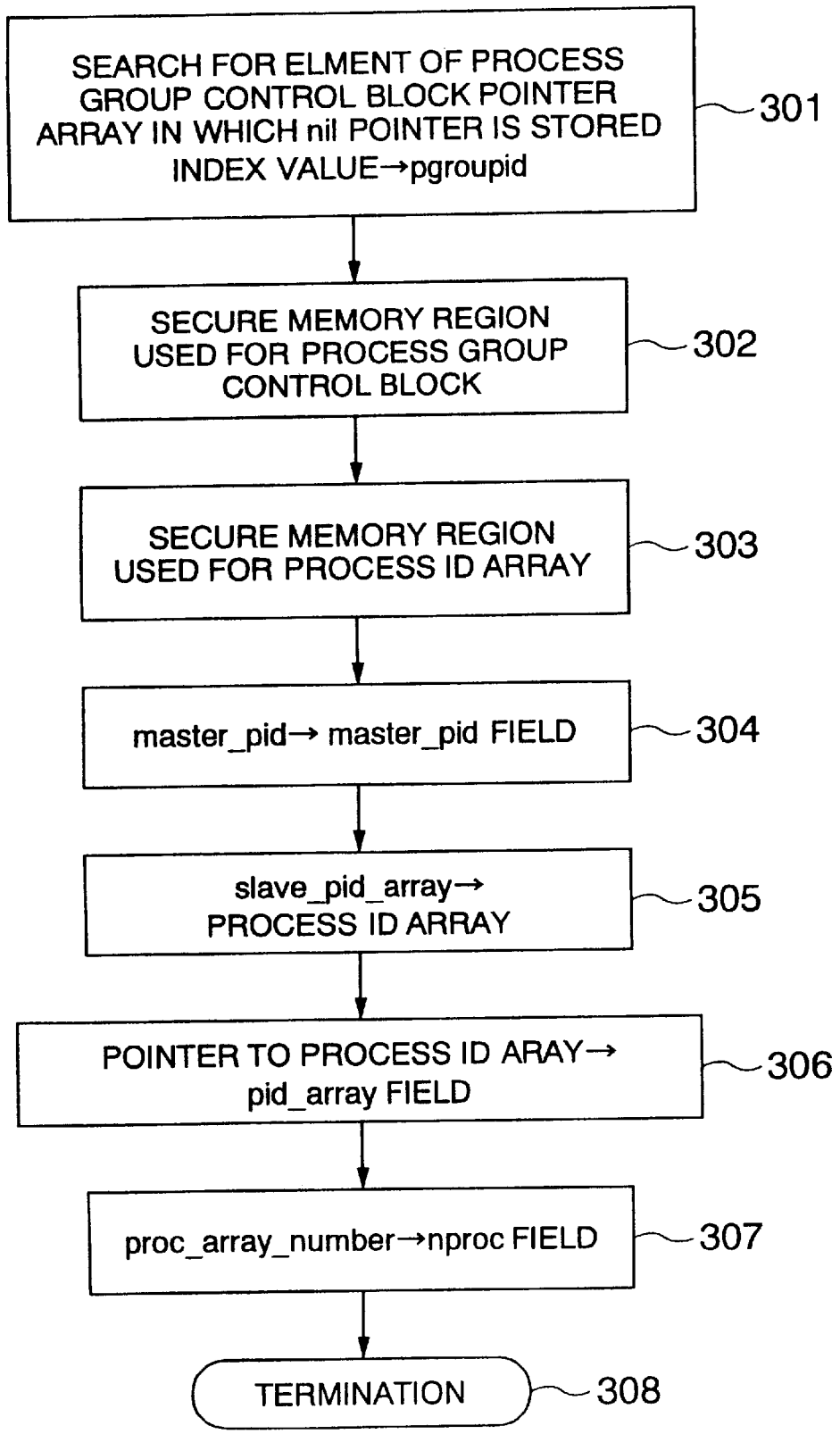
FIG. 3 is a flow chart of "create_proc_group" function.

The processing flow of the "create_proc_group" function is shown in FIG. 3.

At step 301, one element included in elements of the process control block pointer array 201 in which the "nil" pointer is stored is searched for. Its index value is used as a return value of the "pgroupid."

At step 302, a memory region used for the process group control block 202 is secured.

At step 303, a memory region used for the process ID array 206 is secured.

At step 304, the ID of the group master process specified by the argument "master_pid" of the "create_proc_group" function is stored in the "master_pid" field 203 of the process group control block 202 having a memory region secured at the step 302.

At step 305, the array of the process ID of the slave process specified by the argument "slave_pid_array" of the "create_proc_group" function is copied into the process ID array 206 having a memory region secured at the step 303.

At step 306, a pointer to the process ID array is set in the "pid-array" field.

At step 307, the number of slave process IDs forming the process group specified by the argument "proc_array_number" of the "create_proc_group" function is stored in the "nproc" field 205 of the process group control block 202 having a memory region secured at the step 302.

Figure 4:
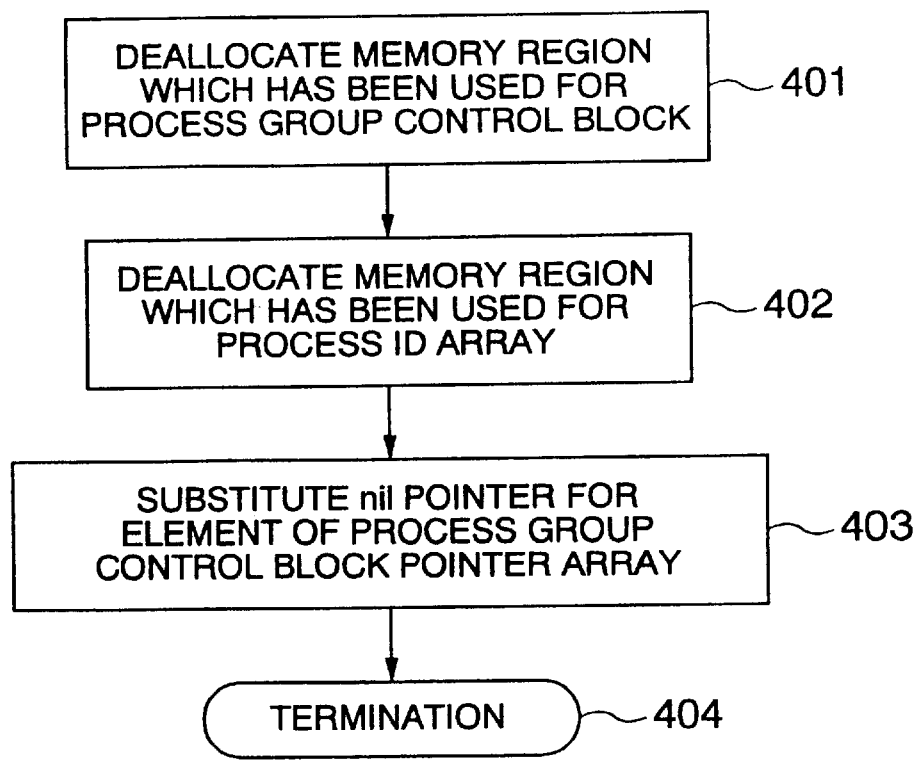
FIG. 4 is a flow chart of "destroy_proc_group" function.

The processing flow of "destroy_proc_group" function is shown in FIG. 4.

At step 401, an element of the process group control block pointer array 201 having the argument "pgroupid" of the "destroy_proc_group" function as the index is searched for, and a memory region which has been used by the process group control block indicated by that element is deallocated.

At step 402, a memory region which has been used by the process ID array 206 indicated by the "pid_array" field of the above described process group control block 202 is deallocated.

At step 403, the "nil" pointer is substituted for an element of the process group control block pointer array 201 corresponding to the process group to be deallocated.

A process group 103 becomes the unit of scheduling. By using the "alloc_time_slot" function at the time of its initializing, the group master of the process group 103 reserves the CPU allocated to the process group 103 over a specified time at intervals each equal to a specified period. If allocation of the CPU time has become unnecessary, the group master calls a "dealloc_time_slot" function and cancels its reservation.

If the "alloc_time_slot" function is called, the scheduler determines the CPU allocation sequence so as to satisfy the period and execution time per period requested by each process group, and creates a scheduling table 900. This creation algorithm will be described afterwards.

On the basis of the scheduling table 900, the periodic kernel process 101 conducts scheduling of each periodic process 102. Upon arrival at the time when the CPU should be allocated to the process group 103, the periodic kernel process 101 sets the priority of the group master process of that process group 103 to "raised." The periodic process having the priority set to "raised" is assured to have the highest priority among user processes. In addition, the process 102 having the priority set to "raised" is assured to have priority higher than that of the periodic kernel process 101.

Upon elapse of the specified time since the priority of the group master process has become "raised," the timer interrupt handler 104 sets the priority of the periodic process 102 having the priority set to "raised" among the periodic processes belonging to the process group 103 to "depressed." (The group master process can inherit the priority of another periodic process 102 belonging to the same process group 103. This will be described afterwards.) The process 102 having the priority set to "depressed" is assured to have the lowest priority among user processes.

Over the time during which the CPU should be allocated to the process group 103, any user process or periodic kernel process 101 which does not belong to the process group 103 is not scheduled so long as a periodic process 102 belonging to the process group 103 having the priority set to "raised" is in the executable state. Over the time during which the CPU should not be allocated, any periodic process 102 belonging to the process group 103 is not scheduled. A CPU time which is not allocated to any periodic process 102 is allocated to the normal process 109 or an idle process which executes an infinite loop and which is always in the executable state. By setting the priority of the idle process to the lowest priority next to "depressed," it is assured that scheduling is not conducted over the time during which the CPU should not be allocated to a periodic process 102 or the periodic kernel process 101. External specifications of the "alloc_time_slot" function and the "dealloc_time_slot" function will be described below.

Function Name
alloc_time_slot(pgroupid, interval, length)
Argument
pgroupid: process group ID assured of CPU allocation
interval: wakeup interval of process
length: execution time of process group per period to be secured
Return Value
SUCCESS: termination or various error codes
Description In the "alloc_time_slot" function, the process group specified by "pgroupid" requests the CPU to be allocated over a time specified by "length" and at a period specified by "interval." The "interval" and "length" are specified by taking a predetermined time slot as the unit. At the period specified by the "interval," the priority of the group master process becomes "raised." By using a "proc_raise_handoff" function (which will be described afterwards), the group master process can set the priority of another process belonging to the process group to "raised," and change the priority of its own process to "depressed" (or reference priority). Upon elapse of a time specified by the "length" since the priority of the group master process became "raised," the priority of a process having the priority set to "raised" and included in the processes belonging to the process group is forcibly changed to "depressed." Furthermore, a timeout signal is transmitted to that process.

The value of the "interval" must be power of 2. If a value other than that is specified, the scheduler conducts processing by assuming that a largest power value of 2 which does not exceed the specified value has been specified.

Function Name
dealloc_time_slot(pgroupid)
Argument
pgroupid: process group ID for canceling the CPU allocation assurance
Return Value
SUCCESS: termination or various error codes
Description In the "dealloc_time_slot" function, the process group specified by "pgroupid" cancels the CPU allocation request which has been held by the process group specified by "pgroupid."

Figure 5:
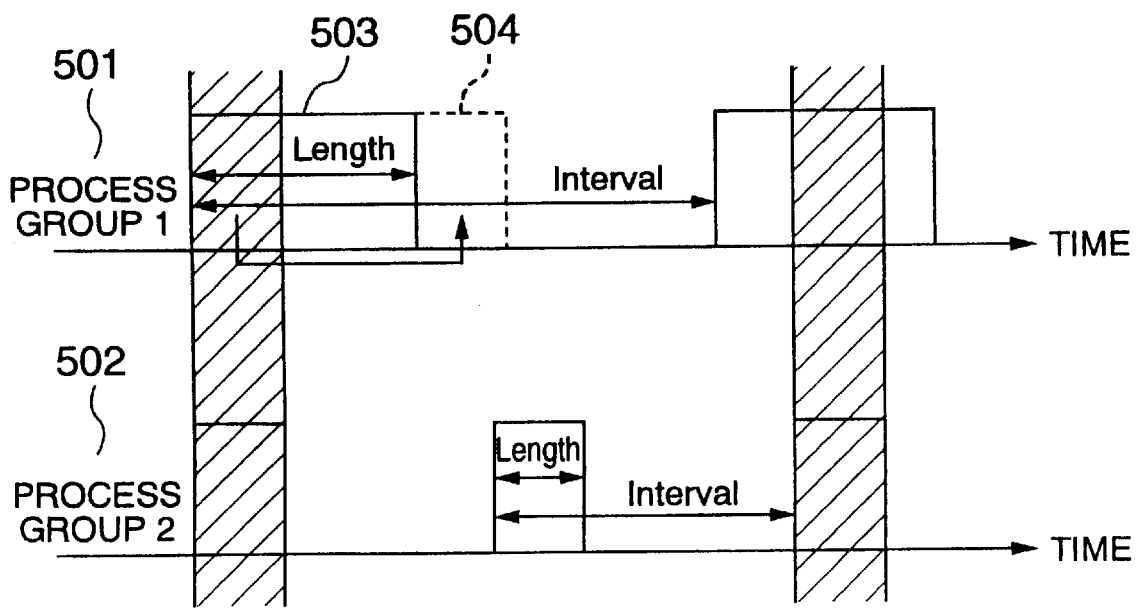
FIG. 5 is a diagram showing a method for eliminating the overlap between CPU tires allocated to a process group.

Upon being requested to allocate the CPU by the "alloc_time_slot" function, the scheduler cannot always conduct scheduling of the process group 103 as requested by all process groups 103. The reason will now be described. As shown in FIG. 5, a plurality of process groups 501 and 502 cannot be scheduled at the same time. Therefore, it becomes necessary to shift the overlap time of the CPU allocation time 503 of either one of overlapping process groups 501 and 502 to a different time 504. That is the reason.

In accordance with the following algorithm, the scheduler determines the CPU allocation time of each process group and register the result in the scheduling table 900 which will be described afterwards. The CPU allocation is conducted by taking the timer interrupt occurrence interval as the unit. By using the timer interrupt occurrence time as a boundary, the real time is divided into a group of time slots. In accordance with the following algorithm, a process group 103 to be allocated is determined for each time slot.

Figure 6:
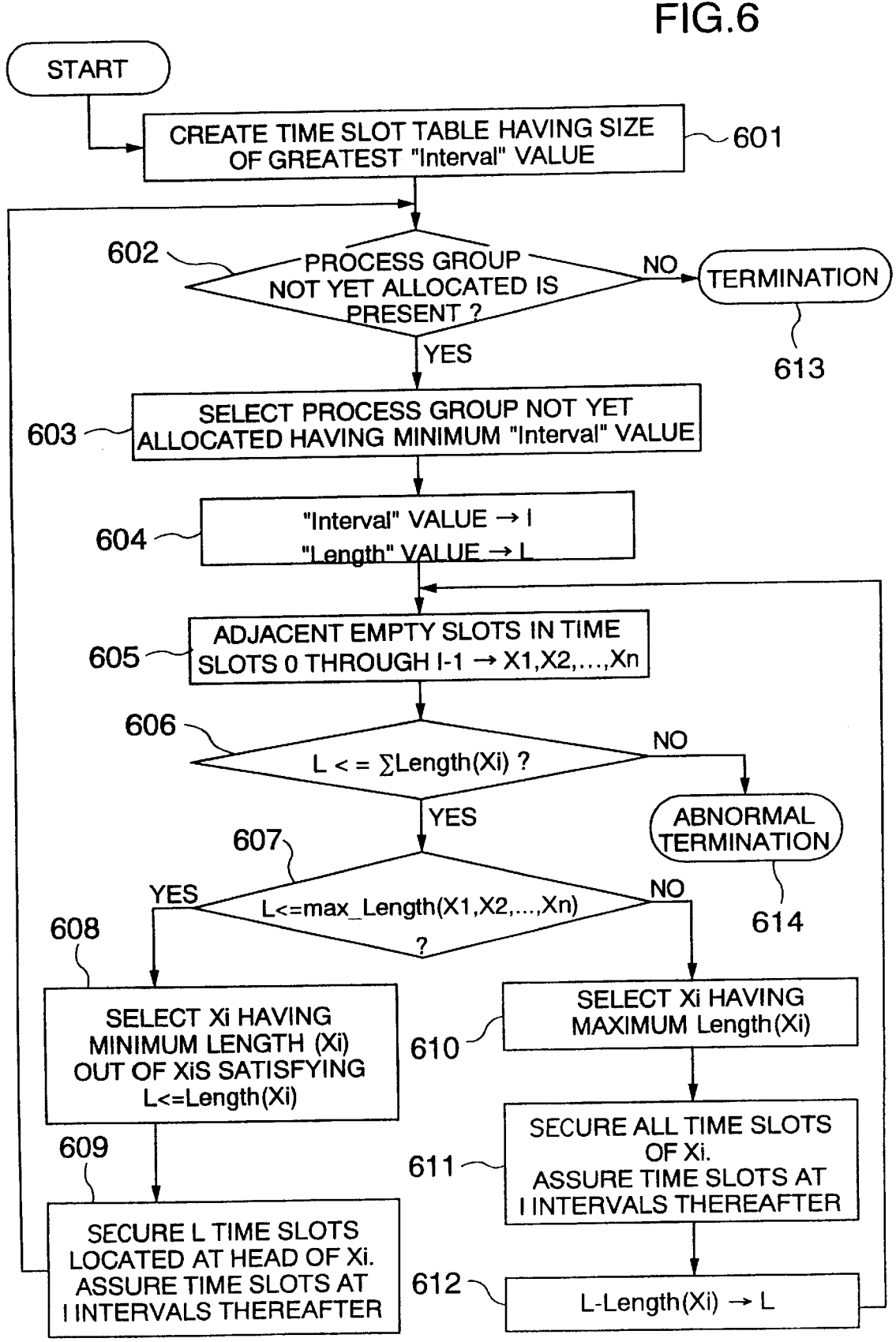
FIG. 6 is a flow chart of a time slot table creation.

The flow chart of the above described algorithm is shown in FIG. 6.

Figure 7:
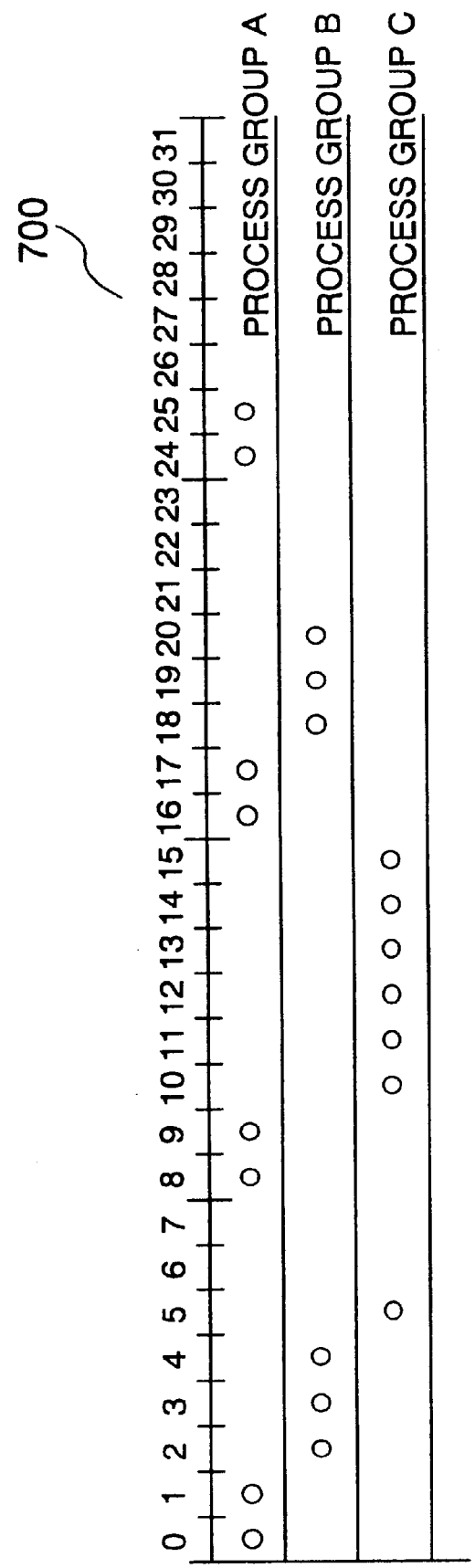
FIG. 7 is a diagram showing a result of a creation example of a time slot table.

At step 601, a time slot table 700 as shown in FIG. 7 is created. The time slot table 700 has the same size as the greatest "interval" value among "interval" values requested by a process group 103 to be allocated (i.e., a process group 103 for which a CPU allocation reservation request has already been issued by the "alloc_time_slot" function). The time slot table 700 is a one-dimensional array. In each element of the array, an ID of a process group 103 to be allocated to a corresponding time slot is stored. As an initial value of each element, an ID indicating that the time slot is not yet allocated is stored.

At step 602, it is determined whether a process group 103 for which a time slot to be allocated has not yet been determined is present. If allocation of time slots for all process groups 103 has been completed, termination takes place at step 613.

At step 603, a process group 103 which is minimum in "interval" value requested at the time of issuance of the "alloc_time_slot" function is selected out of process groups 103 for which a time slot to be allocated has not yet been determined.

At step 604, the requested "interval" value and "length" value of the process group 103 selected at the step 603 are substituted for I and L, respectively.

At step 605, time slots included in time slots 0 through I-1 and not yet allocated are collected in groups every adjacent time slots. Hereafter, time slot groups $X_i$ (i=1, 2, . . . n) subjected to grouping at the present step are referred to as adjacent empty time slots.

If at step 606, the sum total of sizes (the number of time slots) of adjacent empty time slots obtained at the step 605 is less than L, time slot allocation satisfying requests of all process groups 103 is judged to be impossible and abnormal termination takes place (step 614).

At step 607, adjacent empty time slots obtained at the step 605 and having a maximum size are compared in magnitude with L.

If L is less, one having a minimum size is selected at step 608 out of adjacent empty time slots having at least the size of L.

At step 609, L time slots located at the head of the adjacent empty time slots selected at the step 608 are allocated to the process group 103 selected at the step 603. In addition to the time slots allocated at this time, time slots located I, 2I, 3I, . . . time slots after are also allocated to the process group 103 selected at the step 603. Thereby, time slot allocation to the process group 103 selected at the step 603 is completed, and a jump to the step 602 takes place.

If at the step 607 L is greater than the maximum adjacent empty time slot size, adjacent empty time slots having a maximum size are selected at step 610.

At step 611, all time slots belonging to the adjacent empty time slots selected at the step 610 are allocated to the process group 103 selected at the step 603. In addition to the time slots allocated at this time, time slots located I, 2I, 3I, . . . time slots after are also allocated to the process group 103 selected at the step 603.

At step 612, the L minus the size of the adjacent empty time slots selected at the step 610 is set as a new L value, and a jump to the step 605 takes place.

An example of creation of a time slot table 700 will now be described by referring to FIGS. 7 and 8. It is now assumed that the number of process groups 103 to which time slots are allocated is three. In FIG. 8, "interval" values 801 and "length" values 802 requested by each process group 103 are shown.

First of all, the time slot table 700 having a size of 32 which is the maximum value of the "interval" value 801 requested by three process groups 103 is created. Each element of the time slot table 700 is initialized to have an ID indicating that allocation has not yet been conducted.

Time slots allocated to a process group A having a minimum "interval" value 801 are determined. From time slots included in time slots 0 through 7, adjacent empty time slots are generated. In this case one adjacent empty time slot group having a size of 8 formed by time slots 0 through 7 is generated.

The "length" value 802 equivalent to two requested by the process group A is less than the size 8 of the adjacent empty time slots thus generated. Therefore, two time slots located at the head of the adjacent empty time slots, i.e., time slots 0 and 1 are allocated to the process group A. Besides, time slots located thereafter at an interval equal to an integer times of the "interval" value 801 of eight requested by the process group A are also allocated to the process group A. Besides the time slots 0 and 1, time slots 8, 9, 16, 17, 24 and 25 are thus allocated to the process group A. In accordance therewith, corresponding elements of the time slot table 700 are updated. Thereby, allocation of time slots to the process group A is completed.

Subsequently, time slots allocated to a process group B having a second least "interval" value 801 are determined. From time slots 0 through 15, adjacent empty time slots are generated. In this case, two adjacent empty time slot groups each having a size of 6 and respectively including time slots 2 through 7 and time slots 10 through 15 are generated.

The "length" value 802 equivalent to three requested by the process group B is less than this size 6. Out of adjacent empty time slots having a size of at least 3, adjacent empty time slots having a minimum size are selected. Now, adjacent time slots formed by time slots 2 through 7 are selected. Three time slots located at the head of the adjacent empty time slots are allocated to the process group B. In other words, time slots 2 through 4 are allocated to the process group B. In the same way, time slots 18 through 20 are also allocated to the process group B. In accordance therewith, corresponding elements of the time slot table 700 are updated. Thereby, allocation of time slots to the process group B is completed.

Finally, time slots allocated to the process group C are determined. From time slots 0 through 31, adjacent empty time slots are generated. In this case, the following adjacent empty time slots are generated:

adjacent empty time slots having a size of 3 and including time slots 5 through 7;

adjacent empty time slots having a size of 6 and including time slots 10 through 15;

adjacent empty time slots having a size of 3 and including time slots 21 through 23; and adjacent empty time slots having a size of 6 and including time slots 26 through 31.

The "length" value 802 of seven requested by the process group C is greater than the maximum size 6 of the above described adjacent empty time slots. First of all, therefore, one adjacent empty time slot group having a maximum size of 6 is selected. It is now assumed that adjacent empty time slots formed by time slots 10 through 15 have been selected. All time slots belonging to the adjacent empty time slots, i.e., the time slots 10 through 15 are allocated to the process group C. In accordance therewith, corresponding elements of the time slot table 700 are updated.

From the "length" value 802 of seven requested by the process group C, the size 6 of the adjacent empty time slots selected before is subtracted, resulting in a difference of one. Allocation of one time slot thus left is now conducted. Adjacent empty time slots are generated again. In this case, the following adjacent empty time slots are generated:

adjacent empty time slots having a size of 3 and including time slots 5 through 7;

adjacent empty time slots having a size of 3 and including time slots 21 through 23; and adjacent empty time slots having a size of 6 and including time slots 26 through 31.

From adjacent empty time slots having a size of at least 1, adjacent empty time slots having a minimum size is selected. In this case, adjacent empty time slots formed by time slots 5 through 7 are selected. One time slot located at the head of the adjacent empty time slot, i.e., time slot 5 is allocated to the process group C. In accordance therewith, corresponding elements of the time slot table 700 are updated. Thereby, allocation of time slots to the process group C is completed.

Process groups allocated for each time slot by the processing heretofore described are determined as shown in FIG. 7. From this, the scheduler generates the scheduling table 900 shown in FIG. 9. This scheduling table 900 is a table describing the order of process groups 915 to which the CPU should be allocated and their allocation times 916 (the number of time slots). Furthermore, an end flag 917 indicates whether allocation of the process group 915 corresponding to one period is finished when the CPU allocation of that line has been completed. For example, the end flag 917 for 903 becomes OFF, i.e., FALSE, because allocation corresponding to one period is not completed even if the time slot 5 is allocated to the process group C. However, the end flag 917 for 906 becomes ON, i.e., TRUE, because allocation corresponding to one period is completed if the time slots 10 through 15 are allocated. The algorithm for converting the time slot table 700 to the scheduling table 900 is self-evident, and consequently it will not be described. An index 914 is a pointer indicating a line (entry) of the scheduling table 900 to which the CPU is subsequently allocated. A time slot for which the process group 915 specifies "OTHERS" is a time slot allocated to the normal process 109. "OTHERS" 907 indicates that if execution of the periodic process in the process group C is finished before elapse of six time slots allocated to the process group C, time slots which have become empty are allocated to the normal process 109.

Whenever the "alloc_time_slot" function is issued, the scheduler recreates the scheduling table 900 on the basis of the existing table as shown in FIG. 8 and a request conducted by the new "alloc_time_slot" function.

In accordance with the scheduling table 900 generated according to the above described algorithm, the periodic kernel process 101 conducts scheduling of the process group 103. The periodic kernel process 101 changes the priority of a periodic process 102 belonging to the process group 103 which has requested periodic CPU allocation to "raised," "depressed," or reference priority. Thereby, the scheduling is implemented.

Furthermore, a periodic process having priority set to "raised" by the periodic kernel process 101 changes the priority of its own process to "depressed," and changes the priority of other periodic processes belonging to the same process group to "raised." As a result, handoff scheduling in the process group is implemented.

The priority changes are conducted by using "proc_raise," "proc_raise_cancel," "proc_raise_handoff," "proc_depress," and "proc_depress_cancel" functions. External specifications of these functions will be described below.

Function Name
proc_raise(pid, time, flags)
Argument
pid: process ID
time: time during which the priority is kept at "raised"
flags: flag specifying the priority obtained after a specified time has elapsed. The following flags can be specified.
PRIORITY_NORMAL
  The priority of the process is changed to the reference priority.
PRIORITY_DEPRESSED
  The priority of the process is changed to "depressed."
Furthermore, whether a signal is to be transmitted to a process specified by the "pid" when a specified time has elapsed is specified by the following flag.
SEND_SIGNAL
  A timeout signal is transmitted to a process specified by "pid" when a specified time has elapsed.
Return Value
SUCCESS: termination or various error codes
Description The "proc_raise" function sets the priority of a process specified by "pid" to "raised" for a time (the number of time slots) specified by "time." In the "time," time 916 allocated to a process group to which that process belongs or INFINITY is specified. A process having priority set to "raised" is assured of having priority higher than that of any other user process.

Priorities of a plurality of processes cannot be set to "raised" simultaneously. If the present function is called when a process having the priority set to "raised" is already present, the present function returns an error.

In the case where "INFINITY" has been set in "time," n the priority of the process is kept at "raised" until the "proc_raise_cancel" function or the "proc_raise_handoff" function is issued to the process. The "INFINITY" is specified when, for example, the timer interrupt handler 104 wakes up the periodic kernel process 101. When the periodic process 102 is to be waked up, typically the "INFINITY" is not specified.

It is now assumed that a value other than the "INFINITY" is specified in "time" beforehand. If in this case the "proc_raise_cancel" function or the "proc_raise_handoff" function is not issued to the process even when the time specified by "time" has elapsed, the priority of the process is forcibly changed according to the flag specified in "flags." If "PRIORITY_NORMAL" is specified in "flags" beforehand, the priority of the process is changed from "raised" to the reference priority. If "PRIORITY_DEPRESSED" is specified in "flags" beforehand, the priority of the process is changed from "raised" to "depressed." If "SEND_SIGNAL" is specified in "flags" beforehand, a timeout signal is transmitted to that process. The process which has received the timeout signal is waked up according to the preset priority, and the process can conduct processing for the case of timeout.

Function Name
proc_raise_cancel(pid, flags)
Argument
pid: process ID
flags: flag specifying the priority obtained after a change. The following can be specified.
PRIORITY_NORMAL
  The priority of the process is changed to the reference priority.
PRIORITY_DEPRESSED
  The priority of the process is changed to "depressed."
Return Value
SUCCESS: termination or various error codes
Description According to the "flags," the "proc_raise_cancel" function changes the priority of the process set to "raised" by the "proc_raise" function. In the case where "PRIORITY_NORMAL" is specified in "flags" beforehand, the priority after the change becomes the reference priority according to the scheduling attribute. If "PRIORITY_DEPRESSED" is specified in "flags" beforehand, the priority after the change becomes "depressed."

Function Name
proc_raise_handoff(pid, flags)
Argument
pid: process ID
flags: flag specifying the priority obtained after handoff. The following can be specified.
PRIORITY_NORMAL
  The priority of the process is changed to the reference priority.
PRIORITY_DEPRESSED
  The priority of the process is changed to "depressed."
Return Value
SUCCESS: termination or various error codes
Description The "proc_raise_handoff" function sets the priority of the process specified by "pid" to "raised," and changes the priority of its own process according to "flags." The process specified by "pid" must belong to the same process group as the calling process. Otherwise, an error return is caused. If "PRIORITY_NORMAL" is specified in "flags" beforehand, the priority of the calling process after handoff becomes the reference priority. If "PRIORITY_DEPRESSED" is specified in "flags" beforehand, the priority of the calling process after handoff becomes "depressed."

The priority of the calling process must be "raised." If a process having priority other than "raised" calls the present function, the error return is caused.

In the case where an upper limit time during which the priority of the calling process is kept at "raised" (i.e., in the case where something other than "INFINITY" is specified in "time" argument of the "proc_raise" function beforehand), the time during which the priority of the destination process of handoff is kept at "raised" becomes the time during which the priority of the source process of handoff is kept at "raised" and which is left at the time of calling. If an upper limit time during which the priority of the calling process is kept at "raised" is not specified, an upper limit time during which the priority of the destination process of the handoff is kept at "raised" is not present either.

Function Name proc_depress(pid, time, flags)

Argument pid: process ID time: time during which the priority is kept at "depressed"

flags: flag specifying the priority obtained after a specified time has elapsed. The following flags can be specified.

PRIORITY_NORMAL

The priority of the process is changed to the reference priority.

PRIORITY_RAISED

The priority of the process is changed to "raised."

Return Value

SUCCESS: termination or various error codes

Description

The "proc_depress" function sets the priority of a process specified by "pid" to "depressed" for a time (the number of time slots) specified by "time." The process having priority set to "depressed" is assured of having priority lower than any other user process. The "proc_depress" function is issued mainly for the periodic kernel process 101 to lower the priority of its own process and wake up the normal process 109.

In the case where "INFINITY" has been set in "time," the priority of the process is kept at "depressed" until the proc_depress_cancel" function or the "proc_raise_handoff" function is issued to the process.

It is now assumed that a value other than the "INFINITY" is specified in "time" beforehand. If in this case the "proc_raise_cancel" function or the "proc_depress_handoff" function is not issued to the process even when the time specified by "time" has elapsed, the priority of the process is forcibly changed according to the flag specified in "flags." If "PRIORITY_NORMAL" is specified in "flags" beforehand, the priority of the process is changed from "depressed" to the reference priority. If "PRIORITY_RAISED" is specified in "flags" beforehand, the priority of the process is changed from "depressed" to "raised".

Function Name proc_depress_cancel(pid, flags)

Argument pid: process ID flags: flag specifying the priority obtained after a change.

The following flags can be specified.

PRIORITY_NORMAL

The priority of the process is changed to the reference priority.

PRIORITY_RAISED

The priority of the process is changed to "raised."

Return Value

SUCCESS: termination or various error codes

Description

According to the "flags," the "proc_depress_cancel" function changes the priority of the process set to "depressd" by the "proc_depress" function. In the case where "PRIORITY_NORMAL" is specified in "flags" beforehand, the priority after the change becomes the reference priority. If "PRIORITY_RAISED" is specified in "flags" beforehand, the priority after the change becomes "raised."

Figure 10:
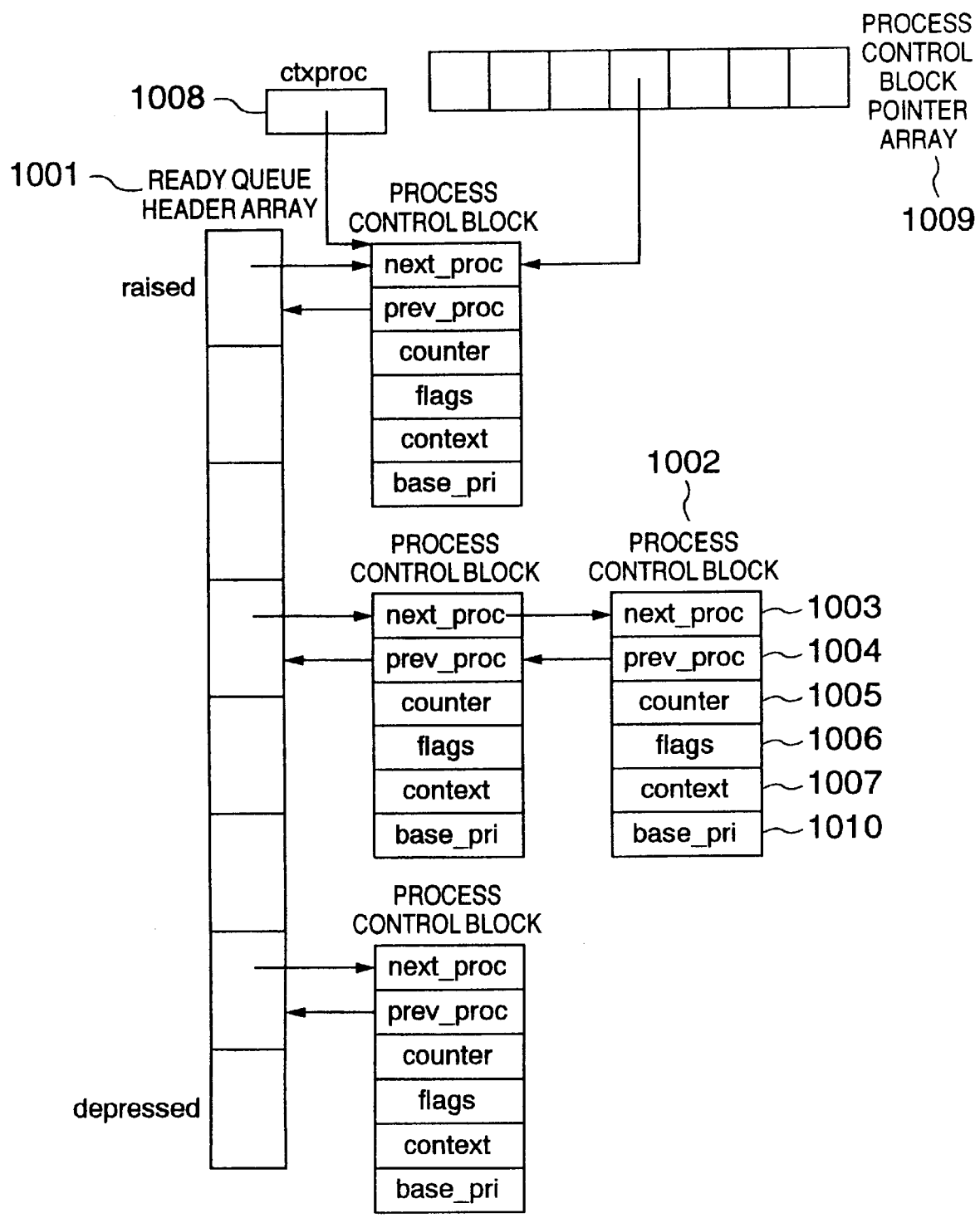
FIG. 10 is a diagram showing the structure of data for managing processes.

The data structure of array data and control block required for implementing the above described function group are shown in FIG. 10.

Process management is conducted by using a process control block 1002. According to priority, process control blocks 1002 of processes assuming the executable (ready) state are connected to bidirectional queues (hereafter referred to as bidirection ready queues) having elements of a ready queue header array 1001 as queue headers. The ready queue header array 1001 is an array of queue headers (i.e., pointers indicating a process control block) of bidirectional queues associated with respective priorities having priority as an index value. It is assumed that priority having a smaller value is higher priority. The value of the highest priority is represented by "raised," and the value of the lowest: priority is represented by "depressed."

The process control block 1002 holds a "next_proc" field 1003 and a prev_proc field 1004 in order to be connected to a bidirectional ready queue associated with priority. In the "next_proc" field 1003 and the "prev_proc" field 1004, a pointer to a process control block 1002 located behind in the bidirectional queue and a pointer to a process control block 1002 located before are stored, respectively. In the "prev_proc" field 1004 of a process control block 1002 located at the head of the bidirectional ready queue, however, a pointer to an element of the ready queue header array 1001 is stored. In the "next_proc" field 1003 of a process control block located at the end of the bidirectional ready queue, a "nil" pointer is stored.

Besides them, a "counter" field 1005, a "flags" field 1006, a "context" field 1007, and a "base_pri" field 1010 are present in the process control block 1002. The "counter" field 1005 holds a remaining time (represented by the number of time slots) during which that process can maintain the priority of "raised" or "depressed." In the "flags" field 1006, there is stored a flag indicating the priority of the process to be changed after the time during the priority of "raised" or "depressed" can be maintained has elapsed. The "context" field 1007 is a region for saving the execution context of the process. In the "base_pri" field 1010, the reference priority of the process is stored at the time of process generation.

Conversion of the process ID to a process control block 1002 is conducted by using a process control block pointer array 1009. Specifically, in an element of the process control block pointer array 1009 having the process ID as an index, a pointer to a process control block 1002 is stored beforehand. In the case where the process control block 1002 corresponding to the process ID is not present, a "nil" pointer is stored beforehand in the corresponding element of the process control block pointer array 1009.

Furthermore, in "ctxproc" 1008, a pointer to the process control block 1002 of a process which is now being executed is stored.

Figure 11:
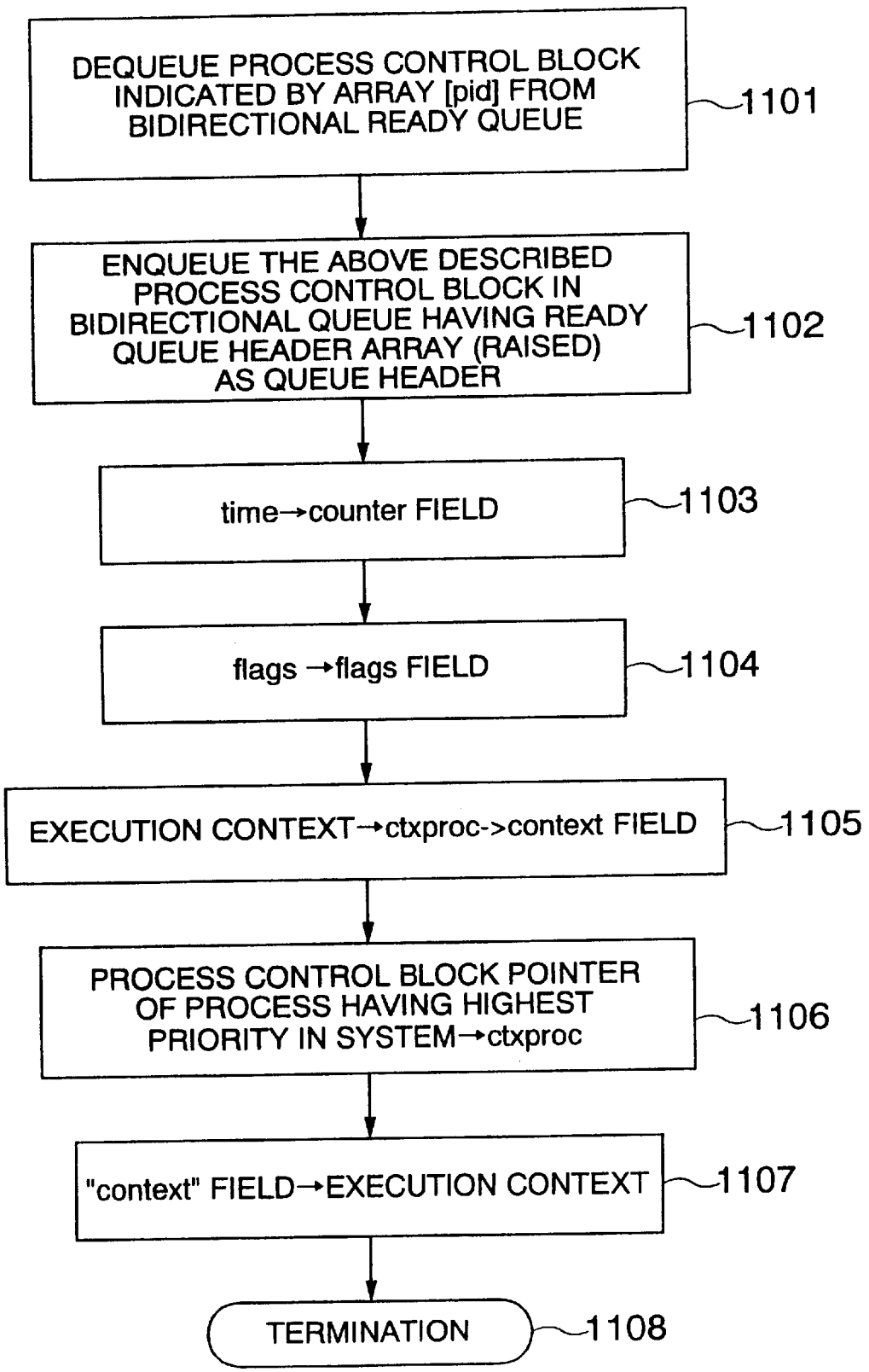
FIG. 11 is a flow chart of "proc_raise" function.

The processing flow of the "proc_raise" function is shown in FIG. 11.

At step 1101, the scheduler derives an element of the process control block pointer array 1009 having the argument "pid" of the "proc_raise" function as the index, and dequeues the process control block 1002 indicated by that element from the bidirectional ready queue.

At step 1102, an element of the ready queue header array 1001 having "raised" as the index, and the process control block 1002 derived at the step 1101 is enqueued at the end of a bidirectional ready queue having that element as the queue header.

At step 1103, the value specified by the argument "time" of "proc_raise" function is stored in the "counter" field 1005 of the process control block 1002 obtained at the step 1102.

At step 1104, the value specified by the argument "flags" of the "proc_raise" function is stored in the "flags" field 1006 of the process control block 1002 obtained at the step 1102.

At step 1105, the current execution contexts (values of various registers) are saved in the context field 1007 of the process control block 1002 indicated by "ctxproc" 1008.

At step 1106, a pointer to the process control block 1002 of the process having the highest priority in the system is stored in the "ctxproc" 1008. The process control block of the process having the highest priority in the system can be searched for by using the following procedure. Out of bidirectional ready queues stored in the ready queue header array 1001, a bidirectional ready queue having a queue length of at least 1 and having a minimum index value is first derived. The process control block 1002 queued at the head of that bidirectional ready queue becomes the derived process control block 1002. Here, the process specified by the argument "pid" of the "proc_raise" function and connected to the ready queue header array 1001 with the value of "raised" at the step 1102 is the process having the highest priority.

At step 1107, the execution context saved in the "context" field 1007 of the process control block derived at the step 1106 is restored. By the processing of the step 1107, process switching is caused and the restored process of the execution context is dispatched. If between the step 1104 and the step 1105 the process control block pointer of the process having the highest priority in the system is compared with contents of the "ctxproc" 1008 and both of them are the same, the processing of the steps 1105 through 1107 may be skipped.

The "proc_raise_cancel," "proc_raise_handoff," "proc_depress," and "proc_depress_cancel," functions can also be implemented by conducting ready queue operation similar to the steps 1101 through 1102, update of various fields of the process control block 1002 similar to the steps 1103 through 1104 (if necessary), saving of the execution context similar to the step 1105, and restoration of the execution context of the process having the highest priority in the system similar to the steps 1106 through 1107. The processing becomes similar to that of the "proc_raise" function and will not be described.

Figure 12:
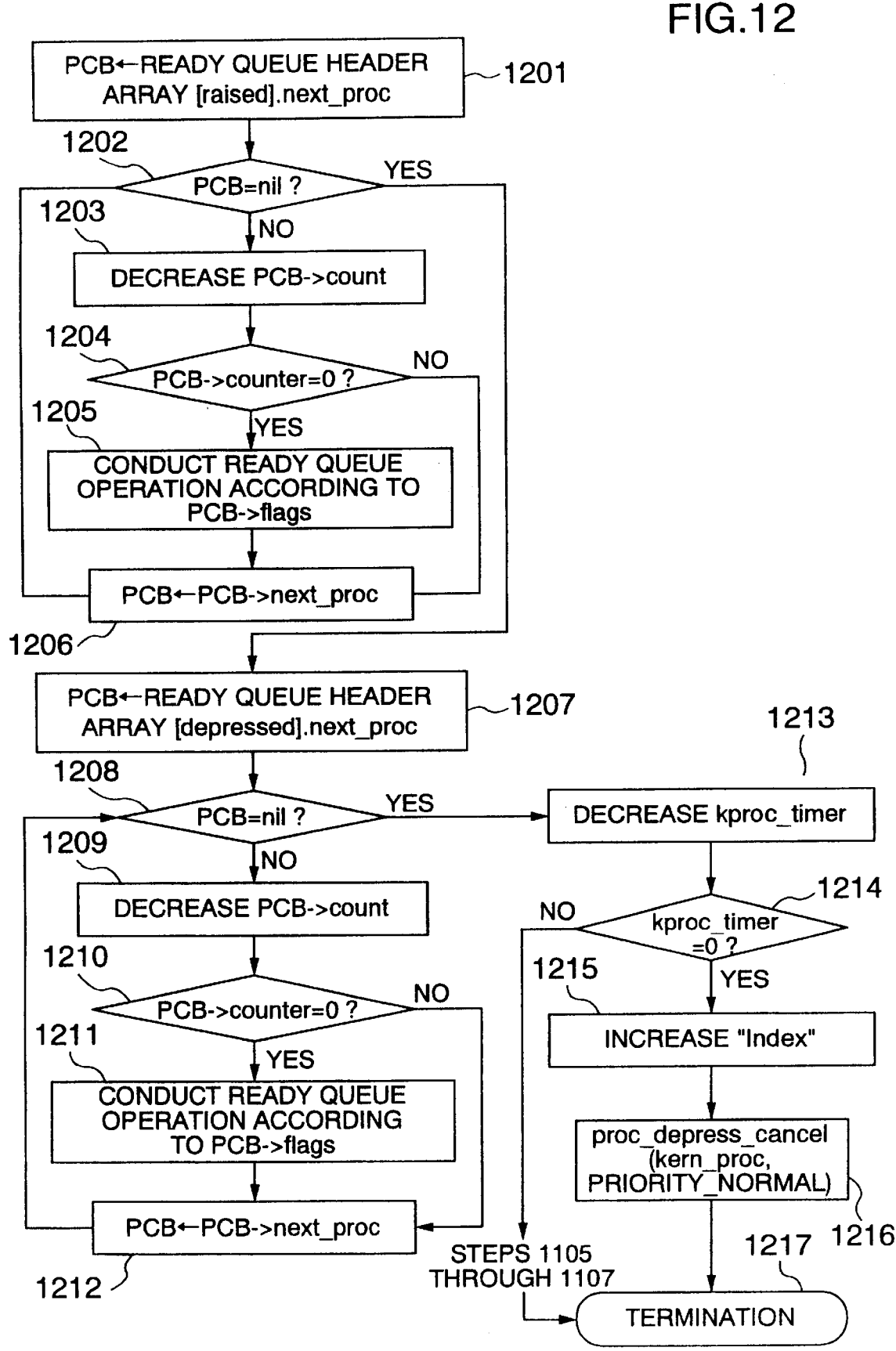
FIG. 12 is a flow chart of a timer interrupt handler.

In the case where the "proc_raise" function and the "proc_depress" function have been issued, it is necessary to determine whether the time specified by the argument "time" has elapsed since issuance of those functions. This determination is conducted in the timer interrupt handler 104 by using the "counter" field 1005 of the process control block. In addition, the timer interrupt handler 104 conducts drive processing of the periodic kernel process 101 as well. The processing flow of the timer interrupt handler 104 conducting them is shown in FIG. 12.

At step 1201, an element having the "raised" of the ready queue header array 1001 as the index is derived, and a pointer to a process control block 1002 stored in that element is substituted for a variable "PCB."

At step 1202, it is determined whether the value of the "PCB" updated at the step 1201 is a "nil" pointer. If it is a "nil" pointer, a jump to step 1207 is effected. Unless it is a "nil" pointer, a jump to step 1203 is effected.

At step 1203, the "counter" field 1005 of the process control block 1002 indicated by the "PCB" is decreased by one. In the case where "INFINITY" is stored in the "counter" field 1005 beforehand, however, nothing is conducted.

At step 1204, it is determined whether the value of the "counter" field 1005 of the process control block 1002 indicated by the "PCB" is 0. If the value of the "counter" field 1005 is 0, a jump to step 1205 is effected. If the value of the "counter" field 1005 is other than 0, a jump to step 1206 is effected.

At step 1205, ready queue operation is conducted according to the "flags" field 1006 of the process control block 1002 indicated by the "PCB." Specifically, the following operation is conducted. First of all, the process control block 1002 indicated by the "PCB" is dequeued from the bidirectional ready queue. In the case where "PRIORITY_NORMAL" is stored beforehand in the "flags" field 1006, an element having as the index a value stored in the "base_pri" field 1010 of the ready queue header array 1001 is then derived, and the process control block 1002 indicated by the "PCB" is enqueued at the end of a bidirectional ready queue having that element as the queue header. In the case where "PRIORITY_DEPRESSED" is stored beforehand in the "flags" field 1006, an element having as the index "depressed" of the ready queue header array 1001 is derived, and the process control block 1002 indicated by the "PCB" is enqueued at the end of a bidirectional ready queue having that element as the queue header.

At step 1206, the value of the "PCB" is updated to have the value of the next proc field 1003 of the process control block 1002 indicated by the "PCB." Thereafter, a jump to the step 1202 is effected.

At step 1207, an element having the "depressed" of the ready queue header array 1001 as the index is derived, and a pointer to a process control block 1002 stored in that element is substituted for a variable "PCB."

At step 1208, it is determined whether the value of the "PCB" updated at the step 1207 is a "nil" pointer. If it is a "nil" pointer, a jump to step 1213 is effected. Unless it is a "nil" pointer, a jump to step 1208 is effected.

At step 1209, the "counter" field 1005 of the process control block 1002 indicated by the "PCB" is decreased by one. In the case where "INFINITY" is stored in the "counter" field 1005 beforehand, however, nothing is conducted.

At step 1210, it is determined whether the value of the "counter" field 1005 of the process control block 1002 indicated by the "PCB" is 0. If the value of the "counter" field 1005 is 0, a jump to step 1211 is effected. If the value of the "counter" field 1005 is other than 0, a jump to step 1212 is effected.

At step 1211, ready queue operation is conducted according to the "flags" field 1006 of the process control block 1002 indicated by the "PCB." Specifically, the following operation is conducted. First of all, the process control block 1002 indicated by the "PCB" is dequeued from the bidirectional ready queue. In the case where "PRIORITY_NORMAL" is stored beforehand in the "flags" field 1006, an element having as the index a value stored in the "base_pri" field 1010 of the ready queue header array 1001 is then derived, and the process control block 1002 indicated by the "PCB" is enqueued at the end of a bidirectional ready queue having that element as the queue header. In the case where "PRIORITY_RAISSED" is stored beforehand in the "flags" field 1006, an element having as the index "raised" of the ready queue header array 1001 is derived, and the process control block 1002 indicated by the "PCB" is enqueued at the end of a bidirectional ready queue having that element as the queue header.

At step 1212, the value of the "PCB" is updated to have the value of the "next_proc" field 1003 of the process control block 1002 indicated by the "PCB." Thereafter, a jump to the step 1208 is effected. At steps 1213 through 1216, drive processing of the periodic kernel process 101 is conducted. The periodic kernel process 101 is driven in the case where an event hereafter described has occurred.

(a) The CPU time to be allocated to the process group 915 has elapsed.

In accordance with the scheduling table 900, the periodic kernel process 101 supplies "times" 916 described in the table to process groups 915 one after another. When the "time" 916 supplied to a process group 915 has elapsed, the count of the "PCB" counter of the process having the priority of "raised" and belonging to that process group 915 becomes 0. By the steps 1204 and 1205, therefore, the priority of that process is changed to lower priority according to "PCB→flags." As a result, the periodic kernel process 101 having high priority next to the "raised" is driven. The periodic kernel process 101 changes the process group 915 to which the CPU should be allocated. In the case where there is not a process group 915 to which the CPU should be subsequently allocated, the periodic kernel process 101 changes its own priority to "depressed" and thereby carries out allocation of the CPU time to the normal process 109.

(b) Minimum interval of a process group 915 requesting allocation of the CPU (which is eight time slots in the example of FIG. 8 and hereafter abbreviated to "minimum interval") has elapsed.

In the case where there is not a process group 915 to which the CPU should be subsequently allocated, the periodic kernel process 101 changes the priority of its own process to "depressed" as described in (a). Each time the "minimum interval" elapses, however, it becomes necessary to allocate the CPU time to the process group 915 requesting the driving conducted at the "minimum interval"s. Therefore, the periodic kernel process 101 is driven at the "minimum interval" periods, to allocate the CPU time to the corresponding process group.

The driving interval of the periodic kernel process 101 according to the "minimum interval" is managed by a variable "kproc_timer." When the scheduling table 900 is created by the "alloc_time_slot" function, this variable is initialized to the "minimum interval" by the scheduler.

At step 1213, the "kproc_timer" is decreased by one.

At step 1214, it is determined whether the value of the "kproc_timer" updated at the step 1213 is 0. The value of 0 indicates the driving invoking of the periodic kernel process 101 described above in (b). For the driving processing of the periodic kernel process 101, the "kproc_timer" is initialized again and thereafter a jump to step 1215 is effected.

In the case where the "kproc_timer" is other than 0, saving restoration processing of the execution context shown in steps 1105 through 1107 is executed. In the case where the CPU time to be allocated to the process group 915 has elapsed (i.e., in the case of (a) described above), the periodic kernel process 101 becomes the process holding the highest priority and the periodic kernel process 101 is driven by execution of the steps 1105 through 1107.

At step 1215, the "index" 914 of the scheduling table 900 is advanced to an entry having "OTHERS" stored in the field of the process group 915. For example, in the case where the "index" 914 indicates the entry of 906 in FIG. 9, the present step updates so that the "index" will indicate the entry of 907. Owing to the present step, the periodic kernel process 101 driven at step 1216 can start processing of allocating the CPU time to the process group 915 from the next entry with respect to the entry storing "OTHERS" in the field of the process group 915. In the case where the "index" 914 already indicates the entry storing "OTHERS" in the field of the process group 915, nothing is conducted.

At step 1216, the "proc_depress_cancel" ("kern_proc," "PRIORITY_NORMAL") function is called. The "kern_proc" represents the process ID of the periodic kernel process 101. If the priority of the periodic kernel process 101 is "depressed," the priority of the periodic kernel process 101 is changed from the "depressed" to the reference priority (high priority next to the "raised") by execution of the present function. If the priority of the periodic kernel process 101 is the reference priority, the priority is not changed by executing this function. At this time point, it is assured that a process having priority "raised" is not present. (The scheduling table 900 is set so that the CPU time will not be allocated to each process group 915 without waiting the driving invoking of the periodic kernel process 101.) Therefore, driving of the periodic kernel process 101 in the above described case (b) can be carried out.

In order to correctly decrease the count of the "PCB→counter" of the periodic process 102 at time slot intervals, the "PCB" of the periodic process 102 must be always connected to the ready queue. Therefore, such a wait that the "PCB" of the periodic process 102 is removed is inhibited. To prevent this, a method described in JP-A-8-226404 is used for mutual exclusion management between processes. As for the input/output, asynchronous input/output is entirely used.

Figure 13:
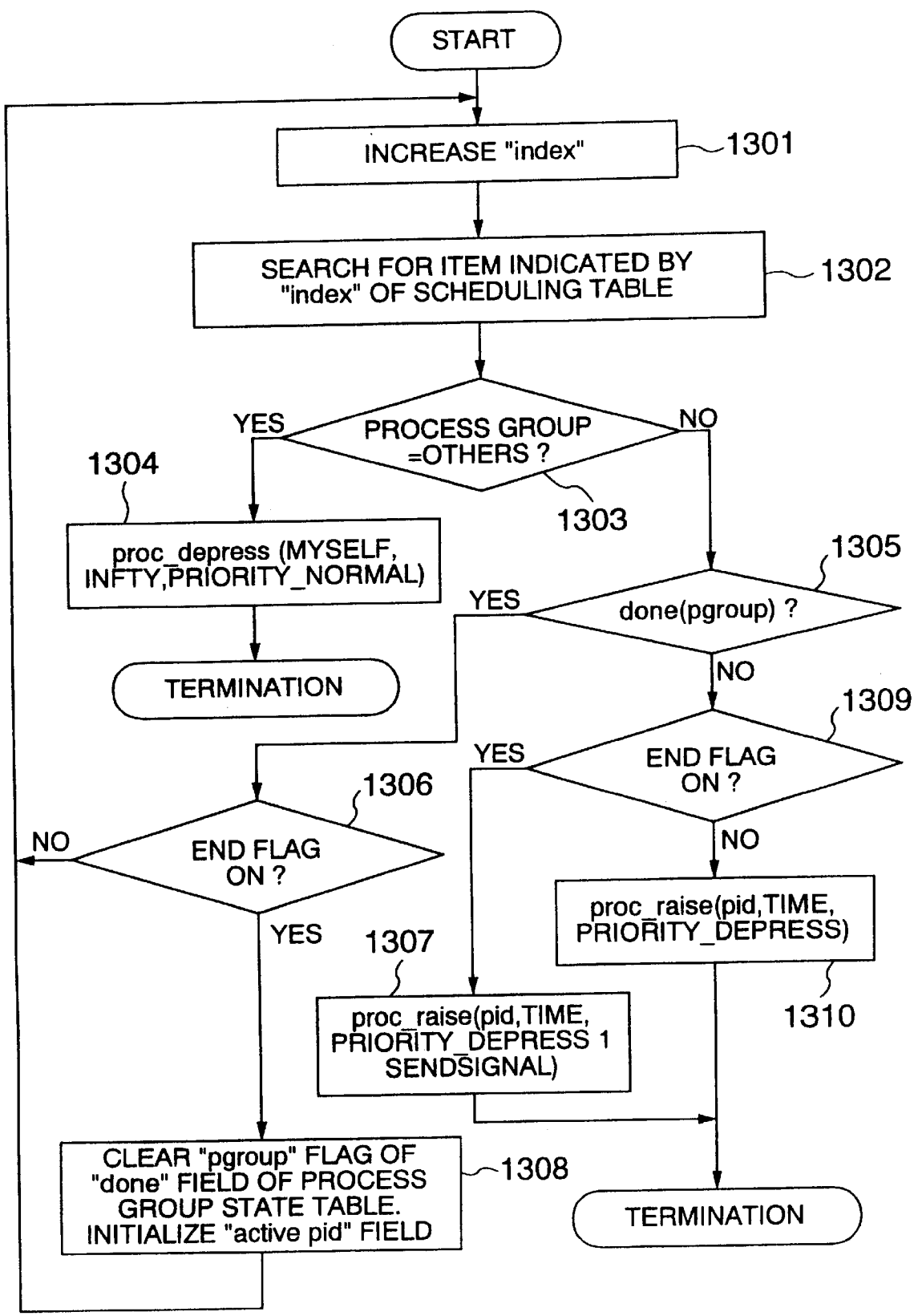
FIG. 13 is a flow chart of a periodic kernel process.

The flow chart of the operation of the periodic kernel process 101 is shown in FIG. 13.

The periodic kernel process 101 is driven by the timer interrupt handler 104 at intervals each equal to the time 916 allocated to the process group 103 requesting the CPU allocation or the "minimum interval." In other words, the process which has been executing the timer interrupt handler 104 at that time wakes up the periodic kernel process 101. The periodic kernel process 101 operates with the reference priority.

At step 1301, the "index" 914 of the scheduling table 900 is increased by a value corresponding to one entry. The "index" 914 of the scheduling table 900 indicates an entry representing a process group 915 to which the CPU should be subsequently allocated by the periodic kernel process 101.

At step 1302, the entry of the scheduling table 900 indicated by the "index" 914 is searched for.

At step 1303, it is determined whether the field of the process group 915 of the entry obtained at the step 1302 contains "OTHERS."

If the process group 915 contains "OTHERS," the "proc_depress (MYSELF, INFINITY, PRIORITY_NORMAL) function is called at step 1304. As a result, the periodic kernel process 101 has priority "depressed" until the "proc_depress_cancel" function is issued. Each time the "minimum interval" of the process group 103 requesting the periodic allocation of the CPU elapses, the "proc_depress_cancel" function is issued from the timer interrupt handler 104. Until then, the normal process 109 which does not conduct the continuous media processing (i.e., a process which does not request the periodic scheduling by using the "alloc_time_slot" function) is subjected to scheduling.

Figure 14:
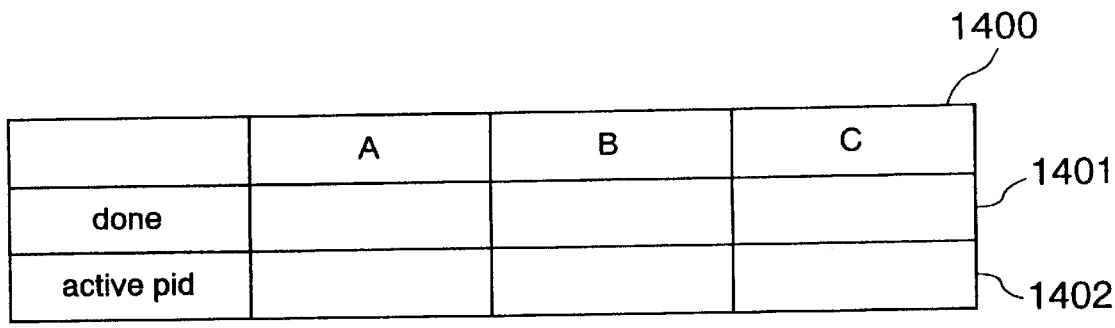
FIG. 14 is a diagram showing the configuration of a scheduling table.

If the process group 915 does not contain "OTHERS," it is determined at step 1305 whether the process group 915 to which the CPU should be subsequently allocated has completed the execution corresponding to one period. This is judged by using a flag of a "done" field 1401 of a process group state table 1400 as shown in FIG. 14. The "done" field 1401 is a field for describing whether the execution corresponding to one period has been completed, for each of process groups 103 requesting the periodic scheduling by using the "alloc_time_slot" function. A periodic process 102 belonging to a process group 103 requesting the periodic scheduling issues the "proc_raise_cancel" function to its own process when the execution corresponding to one period has been completed as described afterwards. The "done" flag of the process group 103 that the periodic process 102 which has called this function belongs to is set within the processing routine of this function.

In the case where the process group 915 of the entry obtained at the step 1302 has completed the execution corresponding to one period, the end flag 917 of that entry is searched for at step 1306.

If the end flag 917 is "FALSE," a return to step 1301 is effected.

If the end flag 917 is "TRUE," a corresponding flag of the "done" field 1401 of the process group state table 1400 is cleared at step 1308. In addition, an "active pid" field 1402 is also initialized. This initializing method will be described below. Thereafter, a return to the step 1301 is effected.

In the case where the execution corresponding to one period has been judged uncompleted at the step 1305, the end flag 917 of the entry obtained at the step 1302 is inspected at step 1309.

If the end flag 917 is "TRUE," "proc_raise (pid, TIME, PRIORITY_DEPRESS|SENDSIGNAL)" is issued at step 1307. In the "pid," the process ID stored in the "active pid" field 1402 of the process group state table 1400 is used. In the "TIME," the value of the time field 916 of the entry is used. The "active pid" field 1402 of the process group state table 1400 represents which periodic process 102 belonging to the process group 103 is now executing the continuous media processing. Immediately after this step, the periodic process 102 specified by the "pid" is scheduled over the time specified by the "TIME."

At step 1308, the corresponding entry is initialized. At step 1308, the entry in the "active pid" field 1402 corresponding to the process group 915 selected at the step 1302 is initialized to have the process ID of the group master of that process group 915. Furthermore, if the "proc_raise_handoff" function is issued, in that processing routine the corresponding entry of the "active pid" field 1402 is updated to have a process ID of the handoff destination. If the "proc_raise_cancel" function is issued and the end flag 917 is "TRUE," in that processing routine the corresponding entry of the "active pid" field 1402 is initialized.

If the end flag 917 is judged to be "FALSE" at the step 1309, "proc_raise (pid, TIME, PRIORITY_DEPRESS)" is issued at step 1310 and processing is terminated. The method for setting the "pid" and "TIME" is similar to that of the step 1307. In this case as well, the periodic process 102 specified by the "pid" is scheduled over the time specified by the "TIME" immediately after this step.

Figure 15:
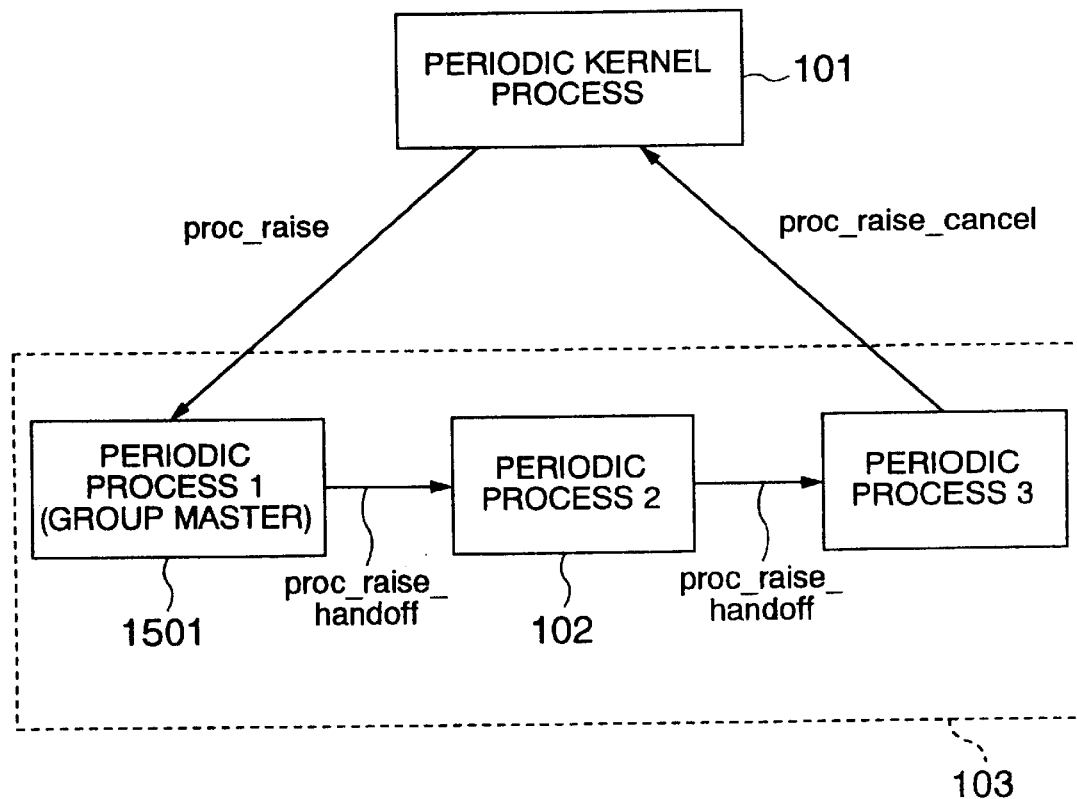
FIG. 15 is a diagram showing the flow of wakeup of continuous media processing process.

Operation of the periodic processes 102 belonging to the process group 103 requesting the periodic scheduling is shown in FIGS. 15 through 17.

FIG. 15 is a diagram showing the wakeup sequence of periodic processes 102 belonging to a process group 103.

The processing order of periodic processes 102 belonging to a process group 103 is predetermined. A group master process 1501 of the process group 103 is made "raised" in priority by the "proc_raise" function of the periodic kernel process 101 to conduct wakeup. By using the "proc_raise_handoff" function, each process 102 belonging to the process group 103 gives its priority to the next periodic process 102 in order. The priority of its own process 102 after inheritance becomes "depressed." By using the "proc_raise_cancel" function, the last periodic process 102 in order completes execution corresponding to one period.

FIG. 16 is a program showing the operation of the group master process 1501.

In a 1601st line, a process group 103 having its own process as the group master process 1501 is created. Thereafter, this process group 103 becomes the unit of scheduling.

In a 1602nd line, it is requested to allocate the CPU time specified by "length" at intervals specified by "interval" to the process group 103 created in the 1601st line. After issuance of this function, the "proc_raise" function is issued to the group master process 1501 by the periodic kernel process as shown in FIG. 15.

A 1603rd line through a 1606th line form a loop for conducting the continuous media processing. After the continuous media processing corresponding to one period has been conducted, the "proc_raise_handoff" function is called and the priority of a process 102 belonging to the process group 103 created in the 1601st line to be subsequently processed is set to "raised" in the 1605th line. The priority of its own process becomes "depressed."

If the execution loop of the continuous media processing has been executed a predetermined number of times, the CPU time allocation request issued in the 1602nd line is canceled in a 1607th line.

Furthermore, in a 1608th line, the process group 103 created in the 1601st line is deleted.

FIG. 17 is a program showing the operation of the slave process 102.

A 1702nd line through a 1704th line form a loop for conducting the continuous media processing.

After the continuous media processing corresponding to one period has been conducted, the "proc_raise_handoff" function is called and the priority of a process 102 belonging to the process group 103 created in the 1601st line to be subsequently processed is set to "raised" in the 1703rd line. The priority of its own process becomes "depressed." However, the last periodic process 102 in order issues the "proc_raise_cancel" function and changes the priority of its own process to "depressed" in the 1704th line. If the execution loop of the continuous media processing has been executed a predetermined number of times, the program is terminated.

In the case where the execution corresponding to one period has not been completed in the CPU allocation time corresponding to one period, a timeout signal is transmitted to the process 102 registered in the "active pid" field 1402 of the process group state table 1400. In addition, a flag indicating "IN_SIFNAL_TRANSACTION" is set in the flag in the "done" field 1401 of the process group table 1400.

As for the process group 103 having this flag set therein, the execution end judgment of the process group 915 at the step 1305 is always "TRUE." Furthermore, clearing the "done" field 1401 at the step 1308 is not conducted either. In other words, the signal handler is scheduled and executed with the reference priority of the periodic process 102 in the same way as the normal process 109. As a result, it can be assured that the processing delay of one stream does not affect the processing of another stream.

According to the first embodiment, a single periodic kernel process 101 conducts periodic scheduling of all process groups 103 on the basis of the scheduling table 900. Therefore, the execution of the periodic process 102 is not delayed due to occurrence of access contention among a plurality of process groups 103 for the CPU time. Furthermore, after the execution priority of a periodic process 102 has been changed, wakeup of the periodic process depending upon the process dispatch is conducted. As compared with the case a periodic process is waked up via inter-process communication, therefore, the overhead caused by the wakeup notice is reduced. Furthermore, the signal handler processing for a process which has exhausted the specified CPU time and caused timeout is executed with the reference priority of that process. Therefore, the signal handler processing is prevented from causing an execution delay of another process group.

Second Embodiment

In the first embodiment, process switching is conducted from the process executing the timer interrupt handler 104 to the periodic kernel process 101 at intervals each equal to the "time" 916 allocated to the process group 103 or the "minimum interval." At this time, therefore, the overhead of the process switch intervenes. In a second embodiment, a module (hereafter referred to as scheduler) for controlling the process scheduling instead of the periodic kernel process 101 is installed, and the timer interrupt handler 104 and the scheduler are executed in the same process. Thereby, the overhead of the process switch from the timer interrupt handler 104 to the periodic kernel process 101 is reduced. The configuration of a system for implementing the present invention by using the scheduler is shown in FIG. 18. While the operation of the scheduler in the present embodiment will be described afterwards by referring to FIG. 20, it is different from the operation of the conventional scheduler shown in the steps 1105 through 1107.

In the system, one scheduler 1801 is present. The scheduler changes the priority of the periodic process, determines a process to be subsequently scheduled, and conducts the dispatch operation of that process. The scheduler is periodically called by a timer interrupt handler 104. In addition, also when a periodic process 102 conducting the continuous media processing gives the priority to the next periodic process 102 in processing order, and when the last process 102 in processing order completes the execution corresponding to one period and changes the priority of its own process, the scheduler is called in the processing routine of each function. These scheduler calling methods will be described in detail afterwards.

In the same way as the first embodiment, periodic processes 102 which process the same continuous media processing data form a process group 103. The creation and deletion of the process group 103 are conducted by using the above described "create_proc_group" and "destroy_proc_group" functions. A periodic process 102 which is the first in processing order in the process group 103 reads continuous media data from an input device 105 via an input buffer 106, and works upon the data. The worked data are delivered to a periodic process 102 which is the next in processing order via a shared buffer 110. A periodic process 102 which is the last in processing order outputs data to an output device 108 via an output buffer 107.

A process group 103 becomes the unit of scheduling. By using the above described "alloc_time_slot" function at the time of its initializing, a group master process of the process group 103 reserves allocation of the CPU to the process group 103 over a specified time at intervals each equal to a specified period. If allocation of the CPU time has become unnecessary, the group master calls the above described "dealloc_time_slot" function and cancels its reservation.

If the "alloc_time_slot" function is called, the scheduler determines the CPU allocation sequence so as to satisfy the period and execution time per period requested by each process group, and creates a scheduling table 900. This creation algorithm was described with reference to the first embodiment.

On the basis of the scheduling table 900, the scheduler 1801 conducts scheduling of each periodic process 102. Upon arrival at the time when the CPU should be allocated to the process group 103, the scheduler 1801 sets the priority of the group master process of that process group 103 to "raised." (In other words, the scheduler 1801 calls the above described "proc_raise" function.) Upon elapse of the specified time since the priority of the group master process has become "raised," the scheduler 1801 called by the timer interrupt handler 104 sets the priority of the periodic process 102 having the priority set to "raised" among the periodic processes belonging to the process group 103 to "depressed." This method of calling the scheduler from the timer interrupt handler and operation of the scheduler will be described in detail afterwards. Over the time during which the CPU should be allocated to the process group 103, any user process which does not belong to the process group 103 is not scheduled so long as a periodic process 102 belonging to the process group 103 having the priority set to "raised" is in the executable state. Over the time during which the CPU should not be allocated, any periodic process 102 belonging to the process group 103 is not scheduled. A CPU time which is not allocated to any process group 103 is allocated to the normal process 109 or an idle process.

As described above, the scheduler 1801 can be called by the timer interrupt handler 104 or a periodic process 102 requesting a priority change of its own process or another process. The form of a command list used to call the scheduler is shown in FIG. 19.

Figure 19:
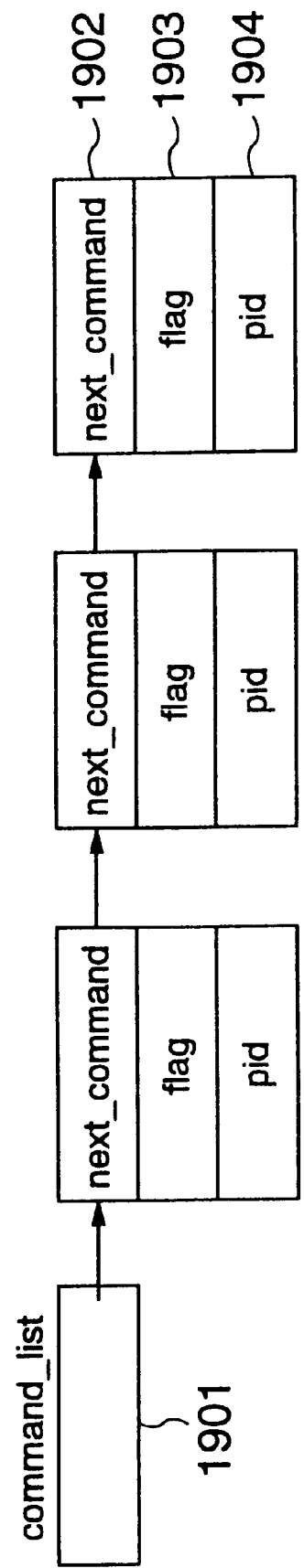
FIG. 19 is a diagram showing the configuration of a command list.

The timer interrupt handler 104 or a periodic process 102 attempting to call the scheduler 1801 specifies a pointer 1901 to an entry located at the head of the command list shown in FIG. 19, as the argument of its calling function. The command list shows scheduler operation orders in a list form. Each entry of the command list is formed by a "next_command" field 1902, a "flag" field 1903, and a "pid" field 1904. In the "next_command" field 1902, a pointer to the next entry is stored. The value of the "next_command" field of the entry located at the end of the list is "nil." In the "flag" field, "HANDOFF," "CANCEL," "INTERVAL," or "TIMER" can be specified. The "pid" field has a meaning only when the "flag" field holds "HANDOFF."

Each time the timer interrupt handler 104 conducts driving, it delivers a command list having an entry with "TIMER" stored in the "flag" to the scheduler 1801. At intervals each equivalent to the "minimum interval" of the process group 103 requesting the CPU allocation, the timer interrupt handler 104 also delivers an entry having "INTERVAL" stored in the "flag" to the scheduler besides the above described entry. Therefore, it is necessary for the timer interrupt handler 104 to judge the "minimum interval" by using the above described "kproc_timer."

In the case where a periodic process 102 gives its priority to the next periodic process in processing order, it delivers a command list having an entry with "HANDOFF" stored in the "flags" and an ID of the next periodic process 102 in processing order stored in the "pid" to the scheduler.

In the case where the last periodic process 102 in processing order completes the execution corresponding to one period and changes the priority of its own process to "depressed," the last periodic process delivers a command list having an entry with "CANCEL" stored in "flags" to the scheduler.

Figure 20:
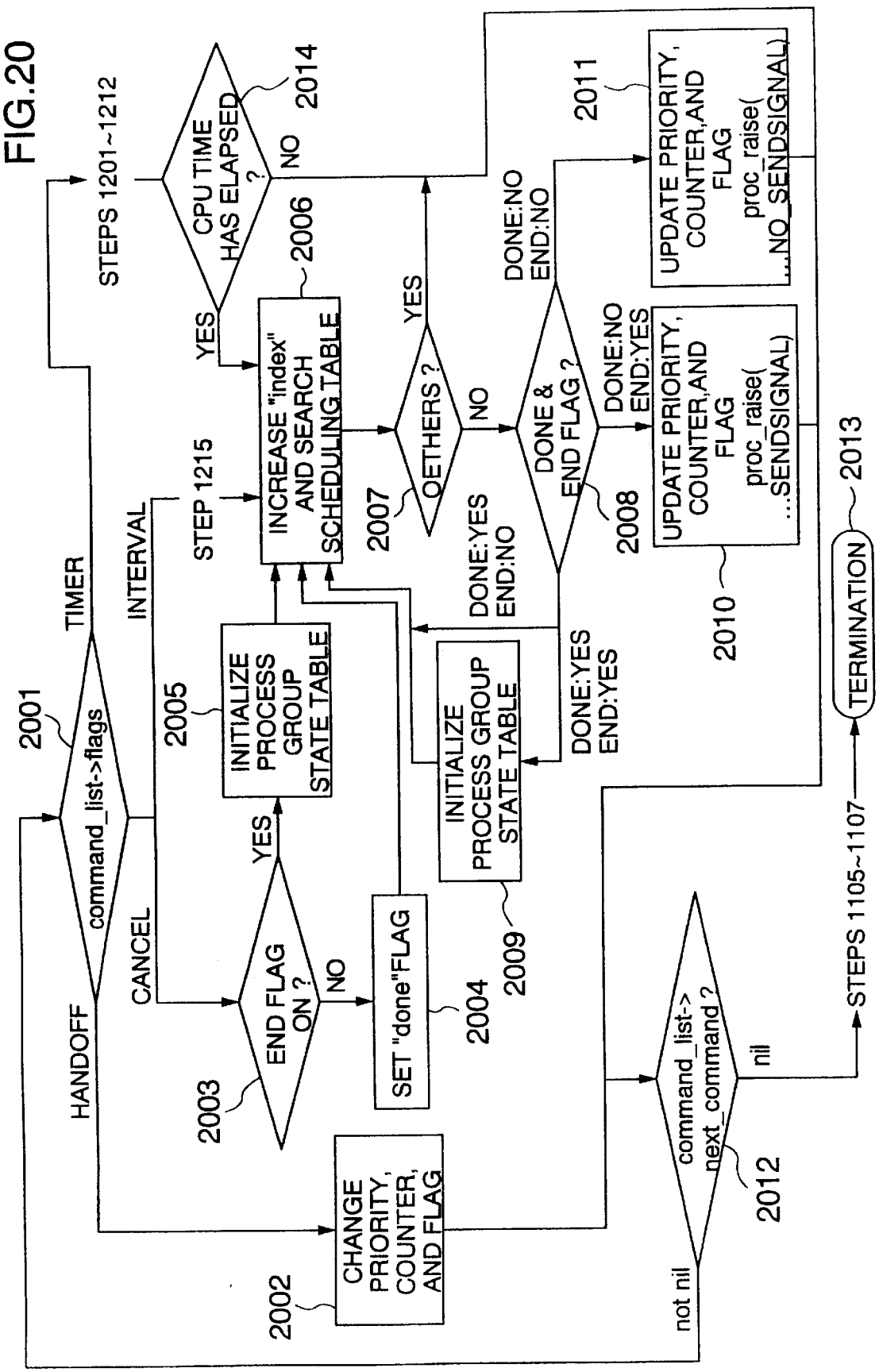
FIG. 20 is a flow chart of a scheduler.

Finally, the operation flow of the scheduler which receives the above described command list and conducts driving will now be described by referring to FIG. 20.

At step 2001, the scheduler searches for the "flag" field of an entry located at the top of the delivered command list. If the "flag" field indicates "HANDOFF," a jump to step 2002 is effected. If the "flag" field indicates "CANCEL," a jump to step 2003 is effected. If the "flag" field indicates "INTERVAL," the step 1215 is executed and then a jump to step 2006 is effected. If the "flag" field indicates "TIMER," the steps 1201 through 1212 are executed. If at step 2014 the process is a process the "PCB→counter" of which has been judged to be 0, i.e., a process for which the CPU time 916 allocated to the process group 915 has elapsed, and the "flag" field indicated by the "next_command" does not hold the "INTERVAL," a jump to step 2006 is effected. In the case where this condition is not satisfied, a jump to step 2012 is effected.

At step 2002, the priority of the periodic process 1202 functioning as the inheritance source of the priority, the priority of the periodic process 1202 functioning as the inheritance destination, and the counter field 1005 and the flag field 1006 in the process control block 1002 are updated. This updating method becomes similar to the flow chart shown in FIG. 11, and consequently it will not be described. Then, a jump to the step 2012 is effected.

At step 2003, the end flag 917 of a process group to which the CPU time has been allocated immediately before the wakeup of the scheduler (an entry indicated by the index 914 of the scheduling table 900) is searched for. If the end flag 917 is ON, a jump to step 2005 is effected. If the end flag 917 is OFF, a jump to step 2004 is effected.

At step 2004, the "done" field 1401 of the corresponding entry of the process group state table 1400 is set, and a jump to the step 2006 is effected.

At step 2005, the same operation as the step 1308 is conducted and a jump to the step 2006 is effected.

At step 2006, the same operation as the steps 1301 through 1302 is conducted and a jump to the step 2007 is effected.

At step 2007, it is inspected whether the field of the process group 915 of the entry obtained at the step 2006 indicates "OTHERS." If it indicates "OTHERS," a jump to step 2012 is effected. If it indicates something other than "OTHERS", a jump to step 2008 is effected.

At step 2008, the end flag 917 of the entry indicated by the index 914 increased at the step 2006 and the "done" field 1401 of the process group state table 1400 corresponding to that entry are searched for. If both bits are set, a jump to step 2009 is effected. If only the "done" field is set beforehand, a jump to step 2006 is effected. If only the end flag is set beforehand, a jump to step 2010 is effected. If both the "done" field and the end flag are cleared beforehand, a jump to step 2011 is effected.

At step 2009, the same operation as the step 1308 is conducted and a jump to step 2006 is effected.

At step 2010, the priority of the periodic process 102 functioning as the group master process 1501 of the process group 103 registered in the entry which is in turn indicated by the index 914 is changed to the "raised" over a time specified by the "time" field 916 of the entry, and the priority of the process and the "counter" field 1005 and the "flag" field 1006 of the corresponding process control block 1002 are updated in order to transmit a signal after an elapse of that time. This updating method becomes similar to the flow chart shown in FIG. 11 and consequently it will be omitted. Thereafter, a jump to the step 2012 is effected.

At step 2011, the priority of the periodic process 102 functioning as the group master process 1501 of the process group 103 registered in the entry which is in turn indicated by the index 914 is changed to the "raised" over a time specified by the "time" field 916 of the entry, and the priority of the process and the "counter" field 1005 and the "flag" field 1006 of the corresponding process control block 1002 are updated in order to transmit a signal after elapse of that time. This updating method becomes similar to the flow chart shown in FIG. 11 and consequently it will be omitted. Thereafter, a jump to the step 2012 is effected.

At the step 2012, the "next_command" field of the entry processed at the steps 2001 through 2011 is searched for. If that value is not "nil," a jump to the step 2001 is effected. If that value is "nil," the steps 1105 through 1107 are executed and thereafter termination is conducted.

Third Embodiment

If a number of asynchronous events such as arrival of network packets occur while the system is operating according to the scheduling method of a periodic process of the first or second embodiment, then execution of the periodic process 102 is obstructed and the jitter of the driving period interval of the periodic process 102 becomes large. In other words, asynchronous event processing such as receiving processing of network packets requires response performance of some degree. If the asynchronous event processing takes preference and the priority of the process conducting that processing is made higher than that of the periodic process 102, a delay might be incurred in the execution time of the periodic process 102. In the third embodiment, the interrupt handler conducting the processing of receiving the network packets is provided with a hierarchical structure. In the timer interrupt handler 104, the periodic kernel process 101, the scheduler 1801, and the process group 103 of the first and second embodiments, there are no changes. The third embodiment is carried out so as to reinforce the first or second embodiment. By taking an interrupt handler conducting the processing of receiving the network packets as an example of the asynchronous interrupt handler, the configuration and operation method of the interrupt handler will hereafter be described.

Figure 21:
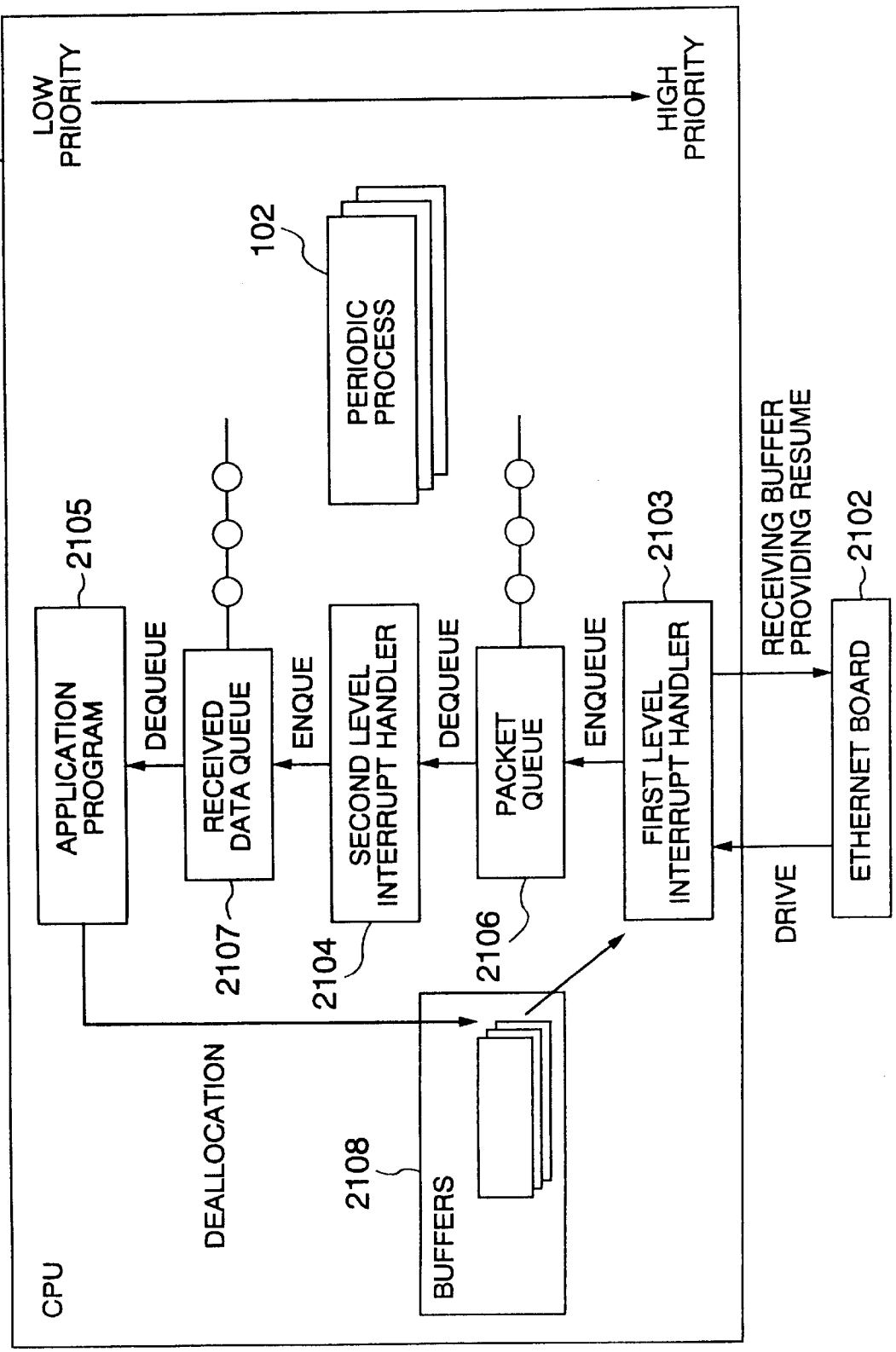
FIG. 21 is a diagram showing the configuration of a network packet receiving system according to another embodiment of the present invention.

FIG. 21 shows the configuration of the system around the present interrupt handler and the configuration of the interrupt handler. The timer interrupt handler 104, the periodic kernel process 101, and the scheduler 1801 are not illustrated.

The present system includes a CPU 2101 and an ethernet board 2102 as hardware. Upon receiving a packet, the ethernet board 2102 functions to notify the CPU 2101 of arrival of the packet and drive, on the CPU 2101, a routine (interrupt handler) for conducting packet receiving processing. Besides a first level interrupt handler 2103 driven by packet receipt, a second level interrupt handler 2104 and an application program 2105 are provided on the CPU 2101. As one of the periodic processes, the second level interrupt handler 2104 is periodically driven by the periodic kernel process 101 or the scheduler 1801 according to the above described scheduling method. The application program 2105 is a business program for processing the received packet, and it is run by a periodic process 102 or the normal process 109.

Figure 22:
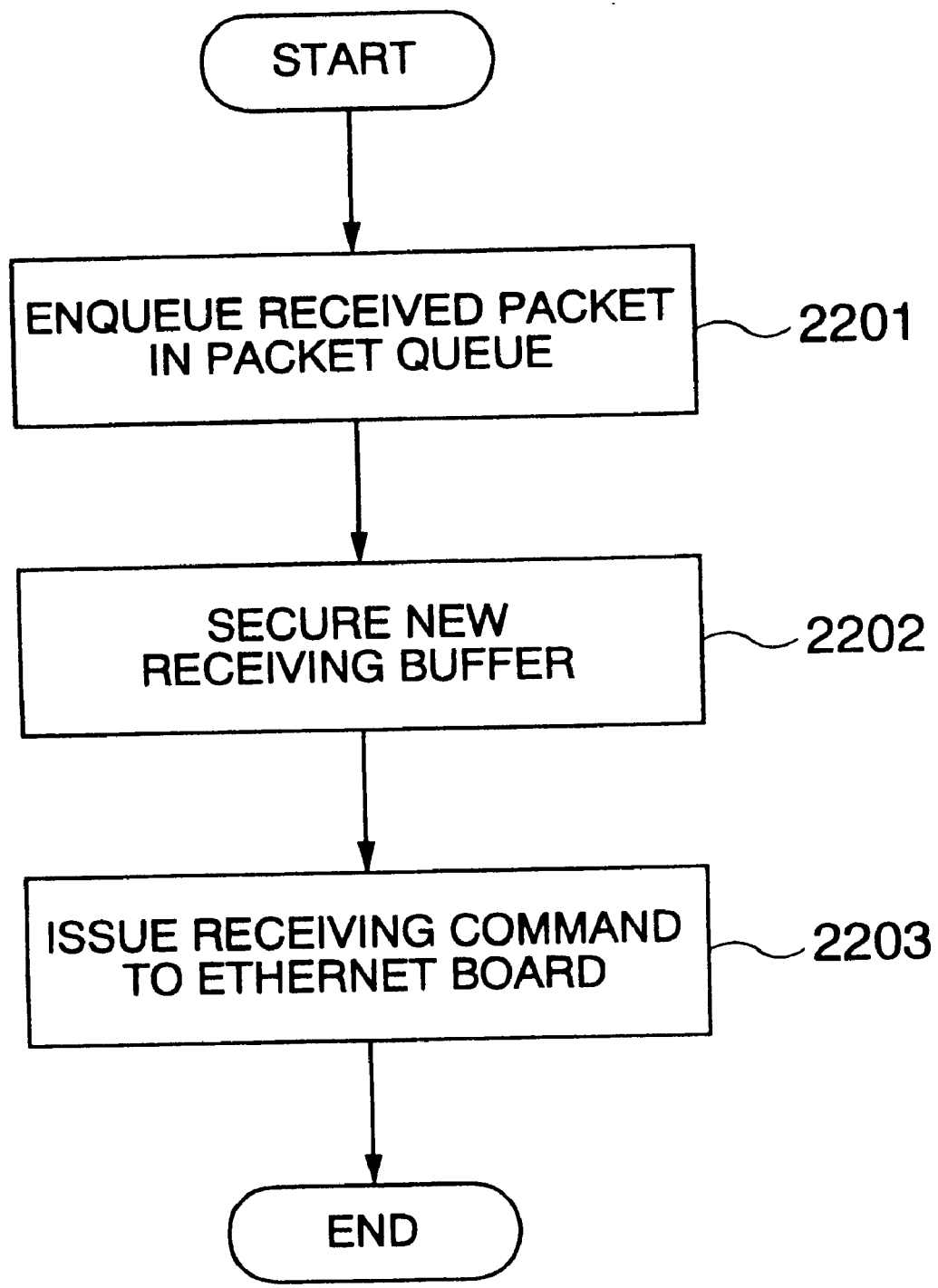
FIG. 22 is a flow chart of first level interrupt handler.

The operation flow of the first level interrupt handler 2103 is shown in FIG. 22.

As described above, the first level interrupt handler 2103 is driven upon a notice of packet arrival given by the ethernet board 2102. At step 2201, the received packet is first enqueued in a packet queue 2106. At step 2202, one receiving buffer is secured out of free buffers 2108. At step 2203, a command requesting the receiving buffer secured at the step 2202 to receive packets is issued to the ethernet board 2102. In other words, all that the first level interrupt handler 2103 performs is to secure the receiving buffer and prepares for packet receiving, and the first level interrupt handler 2103 does not conduct at all the processing of referring to information stored in the receiving buffer. The ethernet board 2102 cannot receive packets which arrive until execution of the step 2203 since notification of packet arrival. Because the address of the receiving buffer which should store received packets is not specified by the first interrupt handler 2103. If a packet arrives during that time, therefore, the ethernet board 2102 fails in packet receiving and that packet is lost, but that time is limited to a minimum.

The second level interrupt handler 2104 is periodically driven with the specified period. A packet enqueued by the first level interrupt handler 2103 and linked to the packet queue 2106 is dequeued, and protocol processing is conducted by referring to the dequeued packet. If received data to be delivered to the application program 2105 are obtained as a result of this protocol processing, the received data are enqueued in a received data queue 2107. Therefore, the second level interrupt handler 2104 is scheduled simply as one of periodic processes 102 belonging to a certain process group 103.

The application program 2105 functions to dequeue the received data enqueued in the received data queue 2107 and deallocate the receiving buffer storing the received data.

In the case where a packet has arrived during execution of a periodic process 102, the execution of the periodic process is suspended and execution of the first interrupt handler 2103 is started. By conducting the execution of the first interrupt handler 2103 with the highest priority, loss of a packet is prevented from being caused due to a failure of the ethernet board 2102 in receiving a packet. In other words, by applying the third embodiment to the first or second embodiment, the probability the packet loss and the execution delay of the periodic process 102 are reduced and both of these advantages are reconciled as compared with the conventional case where the first level interrupt handler 2103 and the second level interrupt handler 2104 are processed by one packet receiving interrupt handler.

The second level interrupt handler 2104 is scheduled as a periodic process 102. Until the time when the CPU 2101 is allocated to its own process is reached, therefore, the second level interrupt handler 2104 does not start the execution even if the packet queue has a packet queued therein. Immediately upon completion of the execution of the first level interrupt handler 2103, therefore, the execution of the periodic process is resumed. By thus providing the interrupt handler with a hierarchical structure, the execution suspension time of the periodic process 102 caused by arrival of a packet can be suppressed to only the execution time of the first level interrupt handler 2103.

Furthermore, the second level interrupt handler 2104 is assured of periodic driving. Until a time corresponding to the driving period elapses since arrival of a packet, therefore, the second level interrupt handler 2104 is driven at least once without fail. In other words, the upper limit of the time required until a packet is enqueued in the received data queue 2107 since arrival of the packet becomes also the driving period of the second level interrupt handler 2104. Thus the response performance of the network packet receiving processing can also be assured.

The periodic process scheduling method according to the first through third embodiments of the present invention have been described in detail. The program for executing the scheduling method in each embodiment is stored in a recording medium such as a hard disk or a CD-ROM as the OS of the computer to be used. Alternatively, the process scheduling program according to the present invention may be downloaded into a resident memory from an external server.

The scheduling method of the present invention provides a CPU time allocation algorithm simultaneously satisfying a plurality of periodic CPU allocation requests. The variation of the execution start interval of the continuous media processing corresponding to one period obtained by using this algorithm is assured of becoming shorter than the driving interval of the periodic kernel process. In addition, for a process which is shorter in requested period, i.e., for a process which should have a suppressed absolute value of a variation of the execution start interval, the CPU time is allocated in a shorter time after the periodic kernel process is driven. As the period of a process becomes shorter, the variation of the execution start interval can be suppressed to a smaller value.

In the case where the arrival rate of the continuous media data is constant, input buffer management such as input buffer switching may be conducted periodically. If the periodic process scheduling can be assured, therefore, the process conducting the continuous media processing may spontaneously switch over input buffers and notification using an interrupt of input continuous media data arrival becomes unnecessary. Improvement in performance of continuous media processing owing to reduction of interrupt overhead can be anticipated.

Furthermore, in the scheduling method of the present invention, the wakeup and sleep of each of processes conducting the continuous media processing are implemented by changing the priority. As compared with the conventional method using the IPC, the overhead required for the wakeup and sleep can be reduced. From this point as well, improvement in performance of the continuous media processing can be anticipated.

In the case where a deadline miss occurs in one process group and a signal is transmitted to the subject process, the priority of the signal handler in the scheduling method of the present invention is assured of being lower than the priority of the process conducting the continuous media processing. Therefore, it can be assured that a processing delay of one stream does not affect the processing of other streams.

Furthermore, in the CPU allocation algorithm of the present invention, time periods allocated to process groups are made continuous as far as possible. Therefore, the number of times of process switching is suppressed to a minimum. Improvement in performance of the continuous media processing owing to the reduction of the overhead required for process switching can also be anticipated.

Furthermore, in the CPU allocation algorithm of the present invention, the execution time ratio between process groups is always kept constant. Even if a synchronizing mechanism such as a rendezvous is not used, therefore, synchronizing between streams can be realized.

Furthermore, the present invention can prevent the variation of the execution interval of the process conducting the continuous media processing when an asynchronous event has occurred.

It should be noted that the scheduling program described in the above embodiments can be down-loaded from a recording medium such as a hard disk or a CD-ROM or an external server to a predetermined location of the main memory of the computer system at the time of booting or switching-on.

We claim:

1. A periodic process scheduling method of a computer system, said computer system including a plurality of process groups, each of said process groups including at least one periodically executed process, said plurality of process groups being executed in parallel, said periodic process scheduling method comprising the steps of:

specifying a wakeup interval period and a required CPU time per period for each of said process groups;

securing a CPU allocation time so as to prevent collision between a CPU allocation time of a specified process group and a CPU allocation time of another specified process group, and adjusting said CPU allocation time and said wakeup period so as to maintain the wakeup interval period of each of said specified process groups;

creating a table for registering therein an order of said process groups to which CPU time is allocated by utilizing a time slot as a unit;

selecting a process group so as to allocate time slots to process groups in order starting from a process group having a shorter wakeup period;

extracting adjacent empty time slots within the wakeup interval period of the selected process group;

responding to the existence of adjacent empty time slots having a size of at least a required CPU time, obtaining, from adjacent empty time slots corresponding to at least the required CPU time and having a minimum size, adjacent empty time slots corresponding to the required CPU time beginning from the head thereof, and allocating the obtained adjacent empty time slots to the selected process group; and responding to the nonexistence of adjacent empty time slots having a size of at least a required CPU time, allocating all time slots belonging to adjacent empty time slots having a maximum size to the selected process group, and allocating a remaining time equivalent to the required CPU time minus the allocated time slots to said process group by using the previous responding step and the present responding step.

2. A method for waking up a process scheduled according to the periodic scheduling method according to claim 1, further comprising the steps of:

responding to the arrival of the wakeup time of one of said process groups;

performing wakeup by changing the execution priority of a process belonging to said process group to a highest priority in a system; and maintaining the highest priority for CPU allocation time consecutively allocated.

3. A process wakeup method according to claim 2, further comprising the steps of:

changing execution priority of said process to a lowest priority ("depressed") in the system upon lapse of the CPU allocation time consecutively allocated;

responding to an order for giving priority of a first process to a second process belonging to same process as the first process before lapse of said CPU allocation time consecutively allocated; and performing wakeup by changing the execution priority of the first process from the highest priority ("raised") in the system to lowest priority and changing execution priority of the second process to the highest priority.

4. A process wakeup method according to claim 2, further comprising the steps of:

responding to the lapse of the CPU allocation time consecutively allocated and consumption of said required CPU time;

changing execution priority of a process waked up from the highest priority to reference priority; and notifying said process of timeout.

5. A process wakeup method according to claim 2, further comprising the steps of:

responding to the lapse of the CPU allocation time consecutively allocated;

waking up a single control process;

waking up said process group; and waking up a process belonging to a process group supplied with next consecutive CPU allocation time by using said control process.

6. A process wakeup method according to claim 2, wherein processing to be conducted between detection of a time for waking up one of said process groups and waking up a process belonging to said process group is executed by a single process.

7. A process wakeup method according to claim 2, further comprising the steps of:

responding to an occurrence of an asynchronous event requiring reception of information including arrival of a network packet during execution of a process having the highest priority in a system;

immediately suspending execution of the process running with the highest priority;

securing an information receiving buffer;

preparing for reception of the information;

resuming the execution of the process suspended in execution thereof; and referring to received information and performing processing by using a periodically waked up process.

8. A computer-readable recording medium for storing a program for ordering periodic process scheduling of a computer system, said computer system including a plurality of process groups, each of said process groups including at least one periodically executed process, said plurality of process groups being executed in parallel, said program comprising:

program means for specifying a wakeup interval period and a required CPU time per period for each of the process groups;

program means for securing a CPU allocation time so as to prevent collision between a CPU allocation time of a specified process group and a CPU allocation time of another process group, and adjusting said CPU allocation time and said wakeup period so as to maintain the wakeup interval period of each of specified process groups;

registering means for creating a table to register therein an order of said process groups to which CPU time is allocated by utilizing a time slot as a unit;

selecting means for selecting a process group so as to allocate time slots to process groups in order starting from a process group having a shorter wakeup period;

extracting means for extracting adjacent empty time slots within the wakeup interval period of the selected process group;

means for responding to the existence of adjacent empty time slots having a size of at least a required CPU time, obtaining, from adjacent empty time slots corresponding to at least the required CPU time and having a minimum size, adjacent empty time slots corresponding to the required CPU time beginning from head thereof, and allocating the obtained adjacent empty time slots to the selected process group; and means for responding to the nonexistence of adjacent empty time slots having a size of at least a required CPU time, allocating all time slots belonging to adjacent empty time slots having a maximum size to the selected process group, and allocating a remaining time equivalent to the required CPU time minus the allocated time slots to said process group by using the previous responding means and the present responding means.

9. A recording medium according to claim 8, wherein said recording medium further comprises:

program means responsive to arrival of the wakeup time for one of said process groups, to perform wakeup by changing the execution priority of a process belonging to said process group to a highest priority ("raised") in a system;

program means for maintaining the highest priority for CPU allocation time consecutively allocated, and changing the execution priority of said process to a lowest priority ("depressed") in the system upon lapse of the CPU allocation time consecutively allocated;

program means responsive to the lapse of the CPU allocation time consecutively allocated, to wakeup a single control process waking up said process group, and wakeup a process belonging to a process group supplied with next consecutive CPU allocation time by using said control process;

means for responding to an order for giving priority of a first process to a second process belonging to same process as the first process before lapse of said CPU allocation time consecutively allocated; and means for performing wakeup by changing the execution priority of the first process from the highest priority ("raised") in the system to lowest priority and changing execution priority of the second process to the highest priority.

\* \* \* \* \*